US012728298B2

(12) United States Patent
Kim et al.

(10) Patent No.: US 12,728,298 B2
(45) Date of Patent: Sep. 8, 2026

(54) MASK APPARATUS

(71) Applicant: LG ELECTRONICS INC., Seoul (KR)

(72) Inventors: Minsoo Kim, Seoul (KR); Hyengcheul Choi, Seoul (KR); Jinmoo Park, Seoul (KR); Seonghun Lee, Seoul (KR); Junchan Kwon, Seoul (KR); Taewook Kwon, Seoul (KR)

(73) Assignee: LG ELECTRONICS INC., Seoul (KR)

(*) Notice: Subject to any disclaimer, the term of this patent is extended or adjusted under 35 U.S.C. 154(b) by 832 days.

(21) Appl. No.: 18/016,476

(22) PCT Filed: Jun. 25, 2021

(86) PCT No.: PCT/KR2021/008028
§ 371 (c)(1),
(2) Date: Jan. 17, 2023

(87) PCT Pub. No.: WO2022/014894
PCT Pub. Date: Jan. 20, 2022

(65) Prior Publication Data

US 2023/0285783 A1 Sep. 14, 2023

(30) Foreign Application Priority Data

Jul. 17, 2020 (KR) ........................ 10-2020-0089074

(51) Int. Cl.
*A62B 18/08* (2006.01)
*A41D 13/11* (2006.01)
(Continued)

(52) U.S. Cl.
CPC ............ *A62B 18/08* (2013.01); *A62B 18/006* (2013.01); *A62B 18/025* (2013.01);
(Continued)

(58) Field of Classification Search
CPC ..... A62B 18/025; A62B 18/045; A62B 18/08; A62B 23/02; A62B 9/006; H04R 1/08;
(Continued)

(56) References Cited

U.S. PATENT DOCUMENTS 2,410,454 A * 11/1946 Motsinger .............. A62B 18/08 128/201.19
3,180,333 A * 4/1965 Lewis .................... A62B 18/08 D24/110.2
(Continued)

FOREIGN PATENT DOCUMENTS

CN 103127633 A * 6/2013
CN 205379577 U * 7/2016
(Continued)

OTHER PUBLICATIONS

International Search Report dated Sep. 29, 2021 issued in Application No. PCT/KR2021/008028.
(Continued)

*Primary Examiner* — Brandy S Lee
*Assistant Examiner* — Mishal Zahra Hussain
(74) *Attorney, Agent, or Firm* — KED & Associates, LLP

(57) ABSTRACT

A mask apparatus according to the present disclosure includes a mask body provided with a microphone; a mask body cover coupled to a front surface of the mask body and having a front opening through which sound is output forward; a sealing portion coupled to a rear surface of the mask body and forming a breathing space; and a first speaker fixed to one of the mask body and the mask body cover and outputting a sound input by the microphone; in which a first resonance space in which the first speaker is accommodated is formed between the mask body and the mask body cover to amplify the sound output from the first speaker and output the sound to the front opening.

12 Claims, 14 Drawing Sheets

(51) Int. Cl.

| | |
|---|---|
| ***A62B 18/00*** | (2006.01) |
| ***A62B 18/02*** | (2006.01) |
| ***G10K 11/178*** | (2006.01) |
| ***H04R 1/02*** | (2006.01) |
| ***H04R 1/28*** | (2006.01) |
| ***H04R 1/40*** | (2006.01) |
| ***H04R 3/12*** | (2006.01) |

(52) U.S. Cl.

CPC .. *G10K 11/17823* (2018.01); *G10K 11/17873* (2018.01); *H04R 1/028* (2013.01); *H04R 1/2811* (2013.01); *H04R 1/403* (2013.01); *H04R 3/12* (2013.01); *A41D 13/11* (2013.01); *G10K 2210/3027* (2013.01); *G10K 2210/3044* (2013.01); *H04R 2420/07* (2013.01)

(58) Field of Classification Search

CPC ... H04R 1/028; A41D 13/11; A61M 2205/186

See application file for complete search history.

(56) References Cited

U.S. PATENT DOCUMENTS

| | | | | |
|---|---|---|---|---|
| 7,342,502 | B2 * | 3/2008 | Harkins | H04B 1/385 455/90.1 |
| 11,107,454 | B2 * | 8/2021 | Volmer | G10K 11/17881 |
| 2016/0329922 | A1 | 11/2016 | Volmer et al. | |
| 2019/0009114 | A1 * | 1/2019 | Han | A41D 1/002 |

FOREIGN PATENT DOCUMENTS

| | | | | | |
|---|---|---|---|---|---|
| CN | 110652663 | A | * | 1/2020 | H04R 27/00 |
| DE | 10 2015 005 577 | | | 11/2016 | |
| DE | 10 2018 009 777 | | | 6/2020 | |
| DE | 10 2016 002 826 | | | 1/2021 | |
| DE | 10 2020 118 571 | | | 1/2022 | |
| JP | 3220657 | | | 3/2019 | |
| KR | 10-2011-0106729 | | | 9/2011 | |
| KR | 20-2011-0009246 | | | 9/2011 | |
| KR | 20110106729 | A | * | 9/2011 | A62B 18/084 |
| KR | 10-1279046 | | | 7/2013 | |
| KR | 10-1788800 | | | 10/2017 | |
| KR | 10-2018-0024235 | | | 3/2018 | |
| KR | 101940383 | B1 | * | 1/2019 | A62B 23/025 |
| KR | 10-2019-0033299 | | | 3/2019 | |
| KR | 10-2030473 | | | 10/2019 | |
| KR | 102030473 | B1 | * | 10/2019 | A62B 18/084 |
| KR | 20-0491005 | | | 2/2020 | |
| KR | 200491005 | Y1 | * | 2/2020 | A42B 3/306 |
| KR | 10-2020-0076032 | | | 6/2020 | |
| WO | WO-9803225 | A1 | * | 1/1998 | B63C 11/14 |

OTHER PUBLICATIONS

Korean Office Action dated Apr. 14, 2023 issued in Application No. 10-2020-0089074.

German Office Action dated Sep. 10, 2025 issued in Application No. 11 2021 003 816.8.

* cited by examiner

MASK APPARATUS

CROSS-REFERENCE TO RELATED PATENT APPLICATIONS

This application is a U.S. National Stage Application under 35 U.S.C. § 371 of PCT Application No. PCT/KR2021/008028, filed Jun. 25, 2021, which claims priority to Korean Patent Application No. 10-2020-0089074, filed Jul. 17, 2020, whose entire disclosures are hereby incorporated by reference.

TECHNICAL FIELD

The present disclosure relates to a mask apparatus.

BACKGROUND ART

In general, a mask is an apparatus that covers a user's nose and mouth to prevent inhalation and scattering of germs, dust, and the like. The mask is in close contact with the user's face to cover the user's nose and mouth. The mask filters germs, dust, and the like included in the air flowing into the user's nose and mouth, and allows the filtered air to flow into the user's mouth and nose. Air and germs, dust, and the like contained in the air pass through a body of the mask formed of a filter, and germs, dust, and the like are filtered by the body of the mask. However, since air flows into the user's nose and mouth after passing through the body of the mask or flows out to the outside after passing through the body of the mask, the user's breathing is not smooth. Recently, a mask provided with a motor, a fan, and a filter has been developed to solve the above-mentioned problems.

For example, a "multifunctional smart mask" is disclosed in Korean Patent Registration Publication No. 10-1788800. In the multifunctional smart mask according to the prior art, a speaker capable of wireless communication is placed around the ear so that the user can listen to music in a state of wearing the multifunctional smart mask.

However, according to the prior art, there is a problem in that conversation is inconvenient because the sound generated from the user's mouth is not transmitted to the outside in a state of wearing the smart mask. In addition, there is a problem in that the weight of the wearable portion increases because the speaker is installed on the wearable portion attached to the user's ear.

DISCLOSURE

Technical Problem

An object of the present disclosure is to provide a mask apparatus capable of conversation.

An object of the present disclosure is to provide a mask apparatus capable of improving the volume of an output sound.

Technical Solution

According to the present disclosure, a mask apparatus includes a mask body provided with a microphone; a mask body cover coupled to a front surface of the mask body and having a front opening through which sound is output forward; a sealing portion coupled to a rear surface of the mask body and forming a breathing space; and a first speaker fixed to one of the mask body and the mask body cover and outputting a sound input by the microphone, and thus conversation may be possible in a state of wearing the mask apparatus.

In addition, a first resonance space for amplifying the sound output from the first speaker may be formed between the mask body and the mask body cover to increase the volume of the sound output from the first speaker.

In addition, a first space forming portion configured to form a first resonance space when the mask body and the mask body cover are coupled may be included, so that maintenance of the first speaker disposed in the first resonance space may be facilitated.

In addition, by including a second speaker that outputs sound toward the user's ear, it is possible to enjoy music, make phone calls, and the like.

In addition, by forming a second resonance space accommodating the second speaker therein, the volume of sound output from the second speaker can be increased.

In addition, a second space forming portion configured to form a second resonance space when the mask body and the mask body cover are coupled includes a second space forming portion, so that maintenance of the second speaker disposed in the second resonance space can be facilitated.

In addition, the mask apparatus includes a sensor portion for detecting user's breathing information, a motor controller configured to manipulate the operation of the fan module, a wireless communication portion for wireless communication, and a controller so that the first speaker and the second speaker operate according to various situations.

In addition, the sound output from the first speaker is firstly amplified through the third resonance space formed between the user's face and the mask body and is secondarily amplified in the first resonance space formed between the mask body and the mask body cover to output to the outside.

In addition, since a plurality of first and second speakers are provided on both sides of the mask body or mask body cover, sounds output from the first and second speakers may be output in various directions.

In addition, the motor controller outputs sound from the first speaker and the second speaker in a state where the operation of the fan module is controlled based on the user's breathing information, thereby minimizing the interference of the output sound by the operating sound of the fan module.

Advantageous Effect

In the present disclosure, a conversation may be possible in a state of wearing a mask apparatus.

According to the present disclosure, it is possible to increase the volume of sound output from a speaker by utilizing a resonance space.

According to the present disclosure, power consumption of a speaker can be minimized by utilizing a resonance space.

According to the present disclosure, when disassembling the mask apparatus, maintenance of the speaker may be facilitated.

According to the present disclosure, the structure of the mask apparatus can be optimized and the weight thereof can be reduced by disposing the resonance space inside the mask apparatus.

According to the present disclosure, by controlling the operation of the fan module when sound is output from the speaker, it is possible to prevent the sound output from the speaker from being reduced by operating noise of the fan module.

BEST MODE

Figure 1:
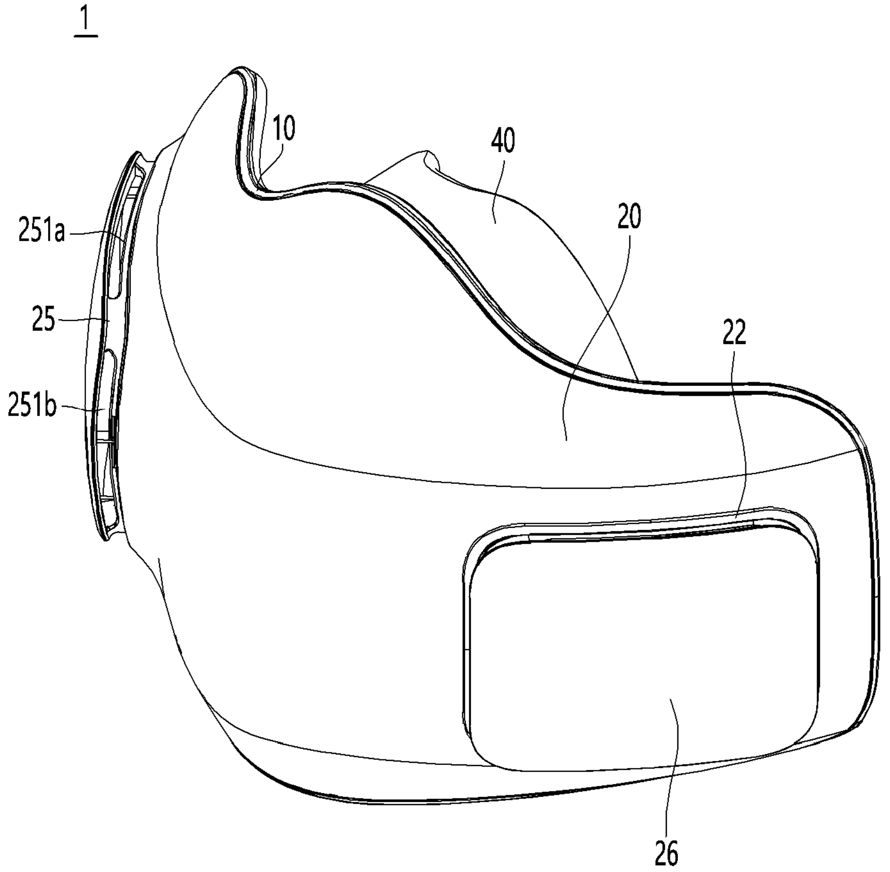
FIG. 1 is a view illustrating a mask apparatus according to an embodiment of the present disclosure.

Hereinafter, some embodiments of the present disclosure will be described in detail through exemplary drawings. In adding reference numerals to the components of each drawing, it should be noted that the same components have the same numerals as much as possible even if they are displayed on different drawings. In addition, in describing an embodiment of the present disclosure, if it is determined that a detailed description of a related known configuration or function hinders understanding of the embodiment of the present disclosure, the detailed description will be omitted.

Also, in the description of embodiments, terms such as first, second, A, B, (a), (b) or the like may be used herein when describing components of the present invention. Each of these terminologies is not used to define an essence, order or sequence of a corresponding component but used merely to distinguish the corresponding component from other component(s). It should be noted that if it is described in the specification that one component is “connected,” “coupled” or “joined” to another component, the former may be directly “connected,” “coupled,” and “joined” to the latter or “connected”, “coupled”, and “joined” to the latter via another component.

Figure 2:
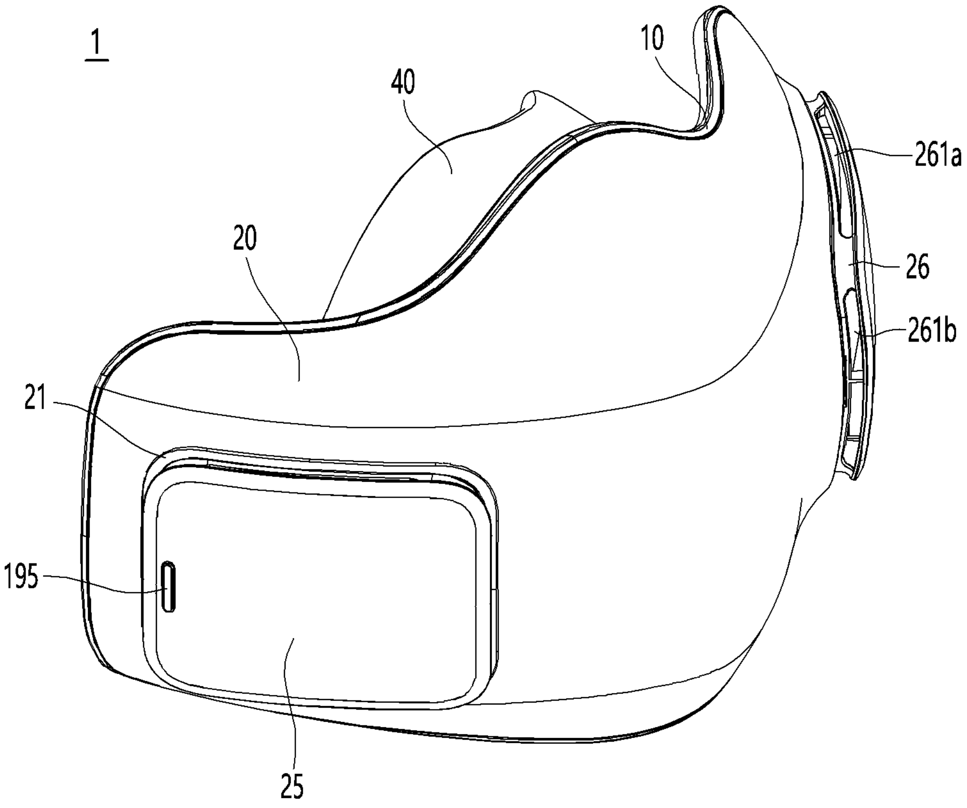
FIG. 2 is a right perspective view illustrating a mask apparatus according to an embodiment of the present disclosure.
Figure 3:
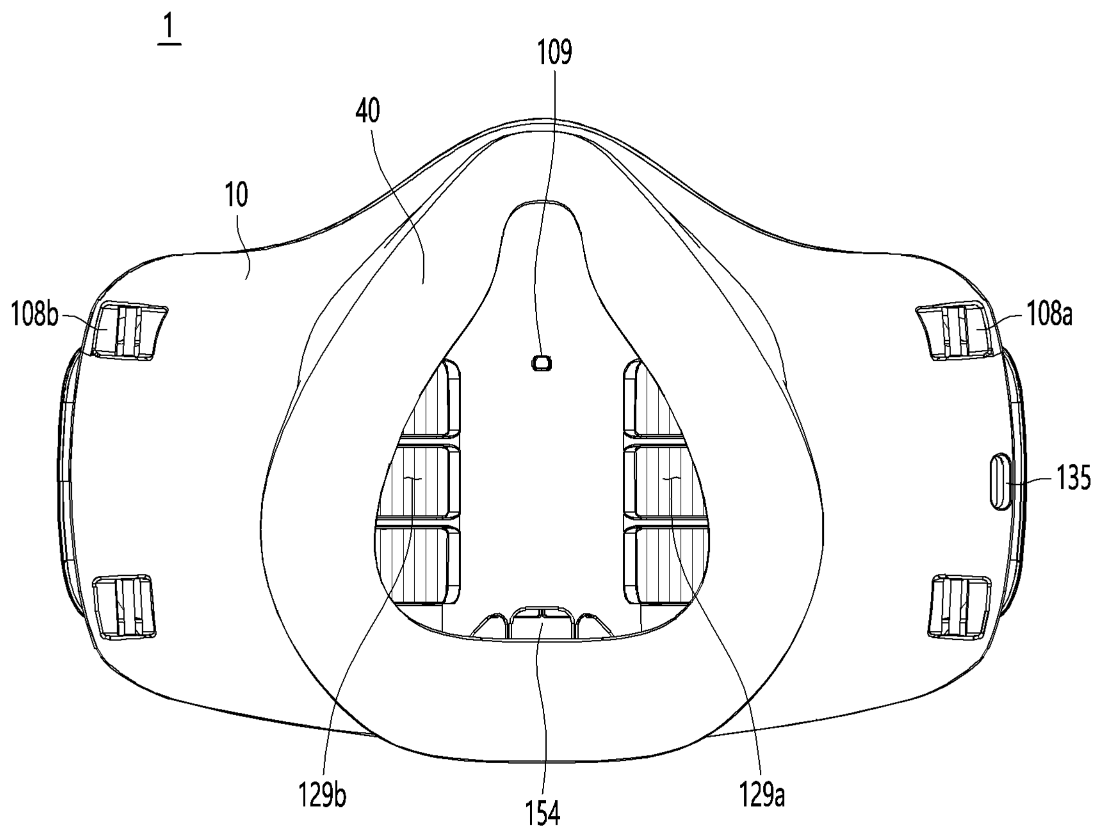
FIG. 3 is a rear view illustrating a mask apparatus according to an embodiment of the present disclosure.
Figure 4:
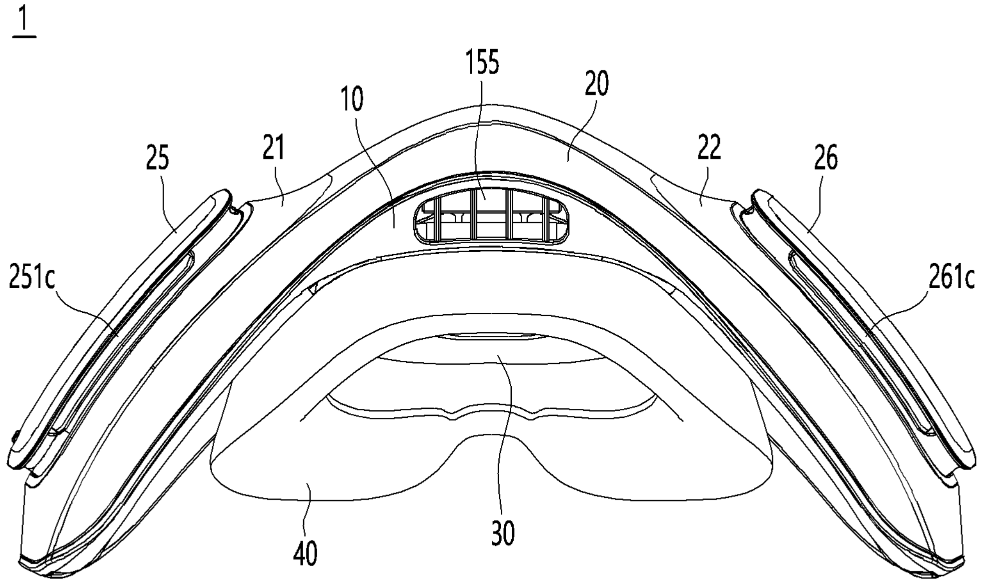
FIG. 4 is a bottom view illustrating a mask apparatus according to an embodiment of the present disclosure.

FIG. 1 is a left perspective view illustrating a mask apparatus according to an embodiment of the present disclosure, FIG. 2 is a right perspective view illustrating a mask apparatus according to an embodiment of the present disclosure, FIG. 3 is a rear view illustrating a mask apparatus according to an embodiment of the present disclosure, and FIG. 4 is a bottom view illustrating a mask apparatus according to an embodiment of the present disclosure.

Referring to FIGS. 1 to 4, a mask apparatus 1 according to an embodiment of the present disclosure may include a mask body 10 and a mask body cover 20 coupled to the mask body 10.

The mask body 10 and the mask body cover 20 may be detachably coupled. When the mask body 10 and the mask body cover 20 are coupled, an inner space may be formed between the mask body 10 and the mask body cover 20. Components for driving the mask apparatus 1 may be disposed in the inner space. The inner space may be located between the front surface of the mask body 10 and the rear surface of the mask body cover 20. The mask body 10 may form a rear surface of the mask apparatus 1, and the mask body cover 20 may form a front surface of the mask apparatus 1.

The rear of the mask apparatus 1 defines as a direction in which the rear surface of the mask apparatus 1 facing the user’s face is located, and the front of the mask apparatus 1 is a direction where the front surface of the mask apparatus exposed to the outside is located and is defined as the opposite direction of the rear.

The mask apparatus 1 may further include a sealing bracket 30 and a sealing portion 40. The sealing bracket 30 may be detachably coupled to the rear surface of the mask body 10. The sealing bracket 30 may fix the sealing portion 40 to the rear surface of the mask body 10. When the sealing bracket 30 is separated from the rear surface of the mask body 10, the sealing portion 40 may be separated from the mask body 10. The sealing portion 40 is supported on the rear surface of the mask body 10 by the sealing bracket 30, and a breathing space for breathing may be defined between the sealing portion 40 and the mask body 10. The sealing portion 40 is in close contact with the user’s face and surrounds the user’s nose and mouth to restrict external air from flowing into the intake space.

The mask body cover 20 may include a first filter mounting portion 21 and a second filter mounting portion 22. The first filter mounting portion 21 may be positioned on the right side of the mask body cover 20, and the first filter mounting portion 21 may be positioned on the left side of the mask body cover 20. Based on the mask apparatus 1 mounted on the user’s face, a left direction (left) and a right direction (right) are defined. In addition, based on the mask apparatus 1 mounted on the user’s face, an upward direction (upward) and a downward direction (downward) are defined.

A first filter cover 25 may be mounted on the first filter mounting portion 21, and a second filter cover 26 may be mounted on the second filter mounting portion 22. A filter is disposed inside the first filter mounting portion 21 and the second filter mounting portion 22, and the first filter cover 25 and the second filter cover 26 may cover the filter. The first filter cover 25 and the second filter cover 26 may be detachably coupled to the first filter mounting portion 21 and the second filter mounting portion 22. For example, the first filter cover 25 and the second filter cover 26 may be fitted and coupled to the first filter mounting portion 21 and the second filter mounting portion 22.

A first air inlet 251 may be formed in the first filter cover 25. A second air inlet 261 may be formed in the second filter cover 26. A plurality of first air inlets 251 and a plurality of second air inlets 261 may be provided. In a state where the first filter cover 25 is mounted on the first filter mounting portion 21, the first air inlet 251 may be exposed to an external space. In a state where the second filter cover 26 is mounted on the second filter mounting portion 22, the second air inlet 261 may be formed to be exposed to an external space. The first air inlet 251 and the second air inlet 261 may be formed on at least one of upper and side surfaces of the first filter cover 25 and the second filter cover 26.

With respect to the filter covers 25 and 26, surfaces facing the filter mounting portions 21 and 22 are defined as bottom surfaces, a surface exposed to the external space is defined as an upper surface, and the a surface connecting the bottom surface and the top surface is defined as a side surface.

When the first air inlet 251 and the second air inlet 261 are provided on the side surfaces of the filter covers 25 and 26, the lower side surfaces of the filter covers 25 and 26 are supported by the filter mounting portion 21 and 22, and the first air inlet 251 and the second air inlet 261 may be formed on upper side surfaces of the filter covers 25 and 26.

In this embodiment, the first air inlet 251 may include a first air inlet 251*a* provided on the side surface of the first filter cover 25 facing upward of the mask apparatus 1, a first air inlet 251*b* provided on the side surface of the first filter cover 25 facing forward, and a first air inlet 251*c* provided on the side of the first filter cover 25 facing downward of the mask apparatus 1. The second air inlet 261 may include a second air inlet 261*a* provided on the side surface of the second filter cover 26 facing upward of the mask apparatus 1, a second air inlet 261*b* provided on the side surface of the second filter cover 26 facing the front of the mask apparatus 1, and a second air inlet 261*c* provided on the side surface of the second filter cover 26 facing downward of the mask apparatus 1.

Meanwhile, an opening for installing a manipulation portion 195 for controlling the operation of the mask apparatus 1 may be formed in one of the first filter cover 25 and the second filter cover 26. The manipulation portion 195 may be provided as an operation switch for turning on/off the power of the mask apparatus 1. The manipulation portion 195 may be exposed toward the front of the mask apparatus 1 through the openings of the filter covers 25 and 26.

The mask body 10 may include a hook mounting portion 108. The hook mounting portion 108 may be provided on the left and right sides of the mask body 10. The hook mounting portion provided on the right side of the mask body 10 is defined as the first hook mounting portion 108*a*, and the hook mounting portion provided on the left side of the mask body 10 is defined as the second hook mounting portion 108*b*. A plurality of first hook mounting portion 108*a* and a plurality of second hook mounting portion 108*b* may be provided to be spaced apart from each other in the vertical direction of the mask body 10. The first hook mounting portion 108*a* may be provided on the upper right and lower right sides of the mask body 10, and the second hook mounting portion 108*b* may be provided on the upper left and lower left sides of the mask body 10. A cord, a string, or the like for wearing the mask apparatus 1 on the user's face may be mounted on the hook mounting portion 108. A cord, a string, or the like may connect the first hook mounting portion 108*a* and the second hook mounting portion 108*b*, or connect the plurality of first hook mounting portions 108*a* spaced apart in the vertical direction, and the plurality of second hook mounting portions 108*a* spaced apart in the vertical direction, respectively.

The hook mounting portion 108 may be formed by cutting a portion of the mask body 10. Therefore, air may flow into the inner space of the mask body 10 and the mask body cover 20 through the hook mounting portion 108. External air flowing into the inner space through the hook mounting portion 108 may air-cool the electronic components disposed in the inner space of the mask apparatus 1. The outside air flowing into the inner space of the mask body 10 through the hook mounting portion 108 is discharged back to the external space through the hook mounting portion 108, and so as to restrict the inflow of the outside air into the breathing space, the inside of the mask apparatus 1 may have a sealing structure.

The mask body 10 may include an air discharge port 129 for discharging filtered air into the breathing space. The user may inhale and breathe the filtered air supplied from the air discharge port 129 to the breathing space. The air discharge port 129 may include a first air discharge port 129*a* for discharging the air flowing into the first air inlet 251 and filtered into the suction space, and a second air discharge port 129*b* for discharging the air flowing into the second air inlet 261 and filtered into the suction space. The first air discharge port 129*a* may be disposed on the right side with respect to the center of the mask body 10, and the second air discharge port 129*b* may be disposed on the left side. Air flowing into the first air inlet 251 may flow to the first air discharge port 129*a* after passing through a filter. The air flowing into the second air inlet 261 may flow into the second air inlet 261 after passing through the filter.

The mask body 10 may include air outlets 154 and 155 for discharging air exhaled by the user to an external space. The air outlets 154 and 155 may be located below the mask body 10.

The air outlets 154 and 155 may include a first air outlet 154 formed by opening the mask body 10 and a second air outlet 155 formed on a lower surface of the mask body 10. A flow space may be formed between the mask body 10 and the mask body cover 20 for the air flowing through the first air outlet 154 toward the second air outlet 155 to pass. A check valve may be formed at one or more of the first air outlet 154 and the second air outlet 155. A reverse flow of external air into the breathing space may be prevented by the check valve. The check valve may be located in a flow space connecting the first air outlet 154 and the second air outlet 155.

The mask body 10 may include a sensor mounting portion 109. A sensor for acquiring information from the breathing space may be mounted on the sensor mounting portion 109. The sensor mounting portion 109 may be located above the mask body 10. The sensor mounting portion 109 may be positioned above the mask body 10 in consideration of a position where a pressure change in the breathing space can be constantly sensed when a user breathes.

The mask body 10 may include a connector hole 135. The connector hole 135 may be understood as an opening in which a connector 192 for supplying power to the mask apparatus 1 is installed. The connector hole 135 may be located on either the left or right side of the mask body 10. In this embodiment, since the manipulation portion 195 and the connector 192 are connected to the power module 19 to be described later, the connector hole 135 may be provided on either the left or right side of the mask body 10 corresponding to the position where the power module 19 is installed.

Hereinafter, components of the mask apparatus 1 will be described in detail based on an exploded perspective view.

Figure 5:
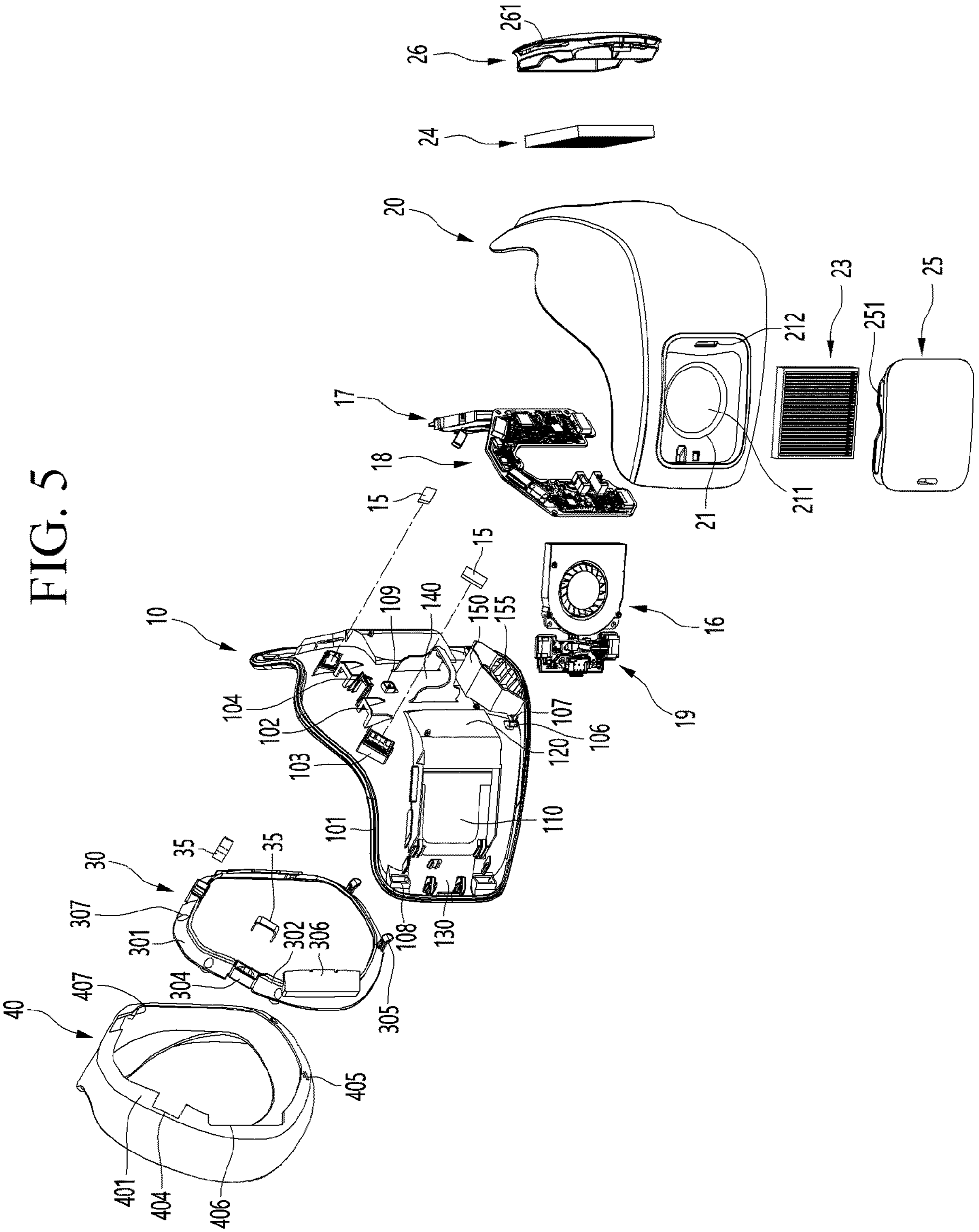
FIG. 5 is an exploded perspective view illustrating a mask apparatus according to an embodiment of the present disclosure.

FIG. 5 is an exploded perspective view illustrating a mask apparatus according to an embodiment of the present disclosure.

Referring to FIG. 5, the mask apparatus 1 according to the present disclosure may include a mask body 10, a mask body cover 20, a sealing bracket 30, and a sealing portion 40. The mask body 10 and the mask body cover 20 may be coupled to each other to form the body of the mask apparatus 1. An internal space for accommodating components for operating the mask apparatus 1 may be formed between the mask body 10 and the mask body cover 20. The sealing bracket 30 and the sealing portion 40 are coupled to the rear surface of the mask body 10 to form a breathing space between the user's face and the mask body 10, and thus it is possible to prevent external air from entering the breathing space.

The mask body 10 may include a cover coupling groove 101. The cover coupling groove 101 may be formed at a front edge of the mask body 10. The cover coupling groove 101 may be formed by a step. The cover coupling groove 101 may be formed to correspond to the edge of the mask body cover 20. The cover coupling groove 101 may be formed by recessing a portion of the front surface of the mask body 10 backward. The mask body cover 20 may be inserted into the cover coupling groove 101 by moving the mask body cover 20 toward the cover coupling groove 101 of the mask body 10.

The mask body 10 may include a first cover coupling portion 102. An upper portion of the mask body cover 20 may be supported by the first cover coupling portion 102. The first cover coupling portion 102 may be formed on the front surface of the mask body 10. The first cover coupling portion 102 may be located above the mask body 10. For example, the first cover coupling portion 102 may be formed as a hook engaging portion to which a hook is coupled to the front surface of the mask body 10. A hook coupled to the first cover coupling portion 102 may be formed in the mask body cover 20. A plurality of first cover coupling portions 102 may be provided, and a plurality of hooks corresponding to the first cover coupling portions 102 may be provided. In this embodiment, the first cover coupling portion 102 may be provided on the left and right sides with respect to the center of the mask body 10. The first cover coupling portion 102 may be referred to as an upper cover coupling portion.

The mask body 10 may include a first bracket coupling portion 103. The first bracket coupling portion 103 may be located above the mask body 10. The first bracket coupling portion 103 may support an upper portion of the sealing bracket 30. For example, the first bracket coupling portion 103 is configured to couple the sealing bracket 30 to the mask body 10 by magnetic force. To this end, the first bracket coupling portion 103 may include a first magnetic member 15. The first magnetic member 15 may be made of metal, magnet, or the like. The first magnetic member 15 may be fixed to the front surface of the mask body 10, and the sealing bracket 30 may contact the rear surface of the mask body 10. In this embodiment, the first bracket coupling portion 103 may be formed in a rib shape where the front surface of the mask body 10 protrudes forward and surrounds the first magnetic member 15. The first magnetic member 15 may be fitted into and fixed to the first bracket coupling portion 103 formed in the rib shape. In this embodiment, the first magnetic member 15 is described as being provided as a magnet, and the first magnetic member 15 may include one first magnetic member 15*a* disposed on the right side and the other first magnetic member 15*b*) disposed on the left side, with respect to the center of the mask body 10.

A first body coupling portion 304 configured to be coupled to the mask body 10 by the magnetic force of the first bracket coupling portion 103 may be formed on the sealing bracket 30. The first body coupling portion 304 may include a second magnetic member 35 that can be coupled to the mask body 10 by magnetic force. The first body coupling portion 304 may be formed to firmly fix the second magnetic member 35. The second magnetic member 35 may be made of metal, magnet, or the like. In this embodiment, the second magnetic member 35 is described as being made of metal, but the first magnetic member 15 and the second magnetic member 35 may be made of opposite materials. A plurality of first bracket coupling portions 103 may be provided, and a plurality of first body coupling portions 304 corresponding to the first bracket coupling portions 103 may be provided. In this embodiment, the first bracket coupling portion 103 may be provided on the left and right sides with respect to the center of the mask body 10. The first bracket coupling portion 103 may be referred to as an upper bracket coupling portion.

The mask body 10 may include a support rib 104. The support rib 104 may protrude forward from the front surface of the mask body 10. The support rib 104 may be in contact with the mask body cover 20 when the mask body 10 and the mask body cover 20 are coupled. The mask body 10 and the mask body cover 20 can resist external forces in the front and rear directions by the support ribs 104. A plurality of support ribs 104 may be provided on the front surface of the mask body 10.

Meanwhile, the support rib 104 may perform a function of fixing a portion of the control module 18 mounted on the mask body 10. To this end, the support rib 104 may include a hook shape.

The mask body 10 may include a second cover coupling portion 106. The lower portion of the mask body cover 20 may be supported by the second cover coupling portion 106. The second cover coupling portion 106 may be formed on the front surface of the mask body 10. The second cover coupling portion 106 may be located below the mask body 10. For example, the second cover coupling portion 106 may be formed as a hook on the front surface of the mask body 10.

The mask body cover 20 may be formed with a hook engaging portion coupled to the second cover coupling portion 106. A plurality of second cover coupling portions 106 may be provided, and a plurality of the hook engaging portions may also be provided to correspond to the second cover coupling portion 106. In this embodiment, the first cover coupling portion 102 may be provided on the left and right sides with respect to the center of the mask body 10. The second cover coupling portion 106 may be referred to as a lower cover coupling portion.

The mask body 10 may include the second bracket coupling portion 107. The lower portion of the sealing bracket 30 may be supported by the second bracket coupling portion 107. The second bracket coupling portion 107 may be formed by opening the mask body 10. The second bracket coupling portion 107 may be located below the mask body 10. For example, the second bracket coupling portion 107 may be formed as a through-hole through which the mask body 10 is opened. A second body coupling portion 305 coupled to the second bracket coupling portion 107 may be formed on the sealing bracket 30. A plurality of second bracket coupling portions 107 may be provided, and a plurality of second body coupling portions 305 corresponding to the second bracket coupling portions 107 may be provided. In this embodiment, the second bracket coupling portion 107 may be provided on the left and right sides with respect to the center of the mask body 10. The second bracket coupling portion 107 may be referred to as a lower bracket coupling portion.

The mask body 10 may include a sensor mounting portion 109. The sensor mounting portion 109 may be formed on the front surface of the mask body 10. The sensor mounting portion 109 may be formed so that the front surface of the mask body 10 protrudes forward and has an installation space in which a sensor is installed. A hole communicating the installation space and the breathing space is formed in the mask body 10, and a sensor disposed in the installation space obtains information of the breathing space from air flowing into the installation space through the hole. In this embodiment, the sensor is provided as a pressure sensor and can detect pressure information of the breathing space.

The mask body 10 may include a fan module mounting portion 110. The fan module mounting portion 110 may include a first fan module mounting portion 110*a* to which the first fan module 16 is mounted and a second fan module mounting portion 110*b* to which the second fan module 17 is mounted. The first fan module mounting portion 110*a* and the second fan module mounting portion 110*b* may be formed on the front surface of the mask body 10. The first fan module mounting portion 110*a* may be disposed on the right side of the mask body 10, and the second fan module mounting portion 110*b* may be disposed on the left side of the mask body 10. The first fan module 16 and the second fan module 17 may be detachably coupled to the first fan module mounting portion 110*a* and the second fan module mounting portion 110*b*.

The mask body 10 may include an air duct portion 120. The air duct portion 120 may be formed on the front surface of the mask body 10. A flow path through which air may pass may be formed inside the air duct portion 120. The air duct portion 120 may include a first air duct portion 120*a* connected to the first fan module mounting portion 110*a* and a second air duct portion 120*b* connected to the second fan module mounting portion 110*b*. The first air duct portion 120*a* and the second air duct portion 120*b* may be disposed on one side of the first fan module mounting portion 110*a* and on the other side of the second fan module mounting portion 110*b*, facing the center of the mask body 10. The first air duct portion 120*a* and the second air duct portion 120*b* may be positioned between the first fan module mounting portion 110*a* and the second fan module mounting portion 110*b*. One end portion of the air duct portion 120 communicates with the fan modules 16 and 17 so that air flows therein, and the other end portion of the air duct portion 120 communicates with the air discharge port 129 so that the flowing air can be discharged.

A control module 18 may be mounted on the air duct portion 120. A portion of the air duct portion 120 may be formed as a curved portion, and the remaining portion of the air duct portion 120 may be formed as a flat portion. The control module 18 may be fixed to the flat portion. The curved portion of the air duct portion 120 may be in contact with the fan module mounting portion to allow air to flow in, and the flat portion may be in contact with the air discharge port 129 to discharge air. The flat portion may have the power module 19 located on the front surface of the mask body 10 and the flow path of the air duct portion 120 located on the rear surface. In the air duct portion 120, the front surface of the flat portion formed as a flat surface on which the control module 18 is seated is defined as the control module mounting portion. A concave-convex portion 122 to be described later may be formed on the rear surface of the flat portion.

The mask body 10 may include a power module mounting portion 130 for mounting the power module 19 thereon. The power module mounting portion 130 may be formed on the front surface of the mask body 10. The power module mounting portion 130 may be provided on either the left side or the right side of the mask body 10. The power module mounting portion 130 may be located on a side of the control module mounting portion 128. The power module mounting portion 130 may be provided between the control module mounting portion and either end portion of the left or right side of the mask body 10. The connector hole 135 may be positioned adjacent to one of the left and right sides of the mask body 10 where the power module mounting portion 130 is provided.

The mask body 10 may include a battery mounting portion 140 for mounting a battery. The battery mounting portion 140 may be formed on the front surface of the mask body 10. The battery mounting portion 140 may protrude forward from the front surface of the mask body 10 and surround the battery. For example, the battery mounting portion 140 may be formed by protruding a plurality of guide ribs forward from the front surface of the mask body 10. Some of the plurality of guide ribs protruding forward are bent in a direction facing each other, and a battery accommodation space in which the battery is accommodated may be formed between the plurality of guide ribs and the front surface of the mask body 10. The battery may be inserted into or separated from the battery accommodation space of the battery mounting portion 140 by moving in a vertical direction. A lower portion of the battery inserted into the battery mounting portion 140 may be supported by an air discharge portion 150 to be described later.

The mask body 10 may include an air discharge portion 150. The air discharge portion 150 may be formed at a lower portion of the mask body 10. The air discharge portion 150 may form a flow space through which air flowing from the first air outlet 154 toward the second air outlet 155 passes. The air discharge portion 150 may be formed by protruding forward from the front surface of the mask body 10. When the mask body 10 and the mask body cover 20 are coupled, the air discharge portion 150 is in contact with the mask body cover 20, and the inner space of the mask body 10 and the flow space may be separated.

For example, the air discharge portion 150 may include a top surface, a bottom surface, and both side surfaces defining a flow space. The front surface of the air discharge portion 150 is defined by the mask body cover 20, and the rear surface of the air discharge portion 150 is defined by the mask body 10. The battery may be supported on an upper surface of the air discharge portion 150. A bottom surface of the air discharge portion 150 may be open, and the second air outlet 155 may be formed. The bottom surface of the air discharge portion 150 is connected to the bottom surface of the mask body 10, and the bottom surface of the mask body 10 may be defined as one surface of the reinforcing rib formed by protruding toward the air discharge portion 150. The cover coupling groove 101 is formed on the bottom surface of the mask body 10, and the lower end portion of the mask body 10 and the mask body cover 20 can be coupled. A rear surface of the air discharge portion 150 may be open, and the first air outlet 154 may be formed. Both side surfaces of the air discharge portion 150 may be formed to be bent.

The mask body cover 20 may include filter mounting portions 21 and 22. The filter mounting portions 21 and 22 may be formed by recessing the front surface of the mask body cover 20 toward the rear surface. Filters 23 and 24 are accommodated inside the recessed filter mounting portions 21 and 22, and filter covers 25 and 26 may be mounted on the filter mounting portions 21 and 22 in a state where the filters 23 and 24 are accommodated.

Air suction port 211 and 221 may be formed on bottom surfaces of the filter mounting portions 21 and 22. The air suction port 211 and 221 may communicate with fan discharge ports of the fan modules 16 and 17 to be described later. The air suction port 211 and 221 may have inclined surfaces inclined downward. Filter cover mounting grooves 212 and 222 for fixing the filter covers 25 and 26 may be formed on side surfaces of the filter mounting portions 21 and 22. Coupling protrusions inserted into the filter cover mounting grooves 212 and 222 may be formed on the filter covers 25 and 26. The upper surfaces of the filter mounting portions 21 and 22 are opened, and the filters 23 and 24 and the filter covers 25 and 26 may be inserted therein. The filter mounting portions 21 and 22 define the front surface of the mask body cover 20 as an upper surface, the rear surface of the mask body cover 20 as a lower surface, and a surface connecting the upper surface and the bottom surface as a side surface.

Bottom surfaces of the filter mounting portions 21 and 22 may be in close contact with fan suction ports of the fan modules 16 and 17 to be described later. A sealing material for sealing may be provided between the filter mounting portions 21 and 22 and the fan modules 16 and 17. The sealing material may cover the air suction port 211 and 221 and the fan suction ports of the fan modules 16 and 17 to prevent external air from flowing therein. The sealing material is not provided, and the air suction port 211 and 221 are in close contact with the fan modules 16 and 17 to prevent external air from flowing therein.

The filter mounting portions 25 and 26 may include a first filter mounting portion 21 provided on the right side of the mask body cover 20 and a second filter mounting portion 22 provided on the left side of the mask body cover 20. An air suction port formed in the first filter mounting portion 21 may be defined as a first air suction port 211, and an air suction port formed in the second filter mounting portion 22 may be defined as a second air suction port 221.

The filters 23 and 24 may include a first filter 23 accommodated inside the first filter mounting portion 21 and a second filter 24 accommodated inside the second filter mounting portion 22.

The filter covers 25 and 26 may include a first filter cover 25 mounted on the first filter mounting portion 21 and a second filter cover 26 mounted on the second filter mounting portion 22. A plurality of first air inlets 251 may be formed in the first filter cover 25 to allow outside air to flow therein, and a plurality of second air inlets 261 may be formed in the second filter cover 26 to allow outside air to flow therein.

Fan modules 16 and 17, a control module 18, and a power module 19 may be provided in the body of the mask apparatus 1. The fan modules 16 and 17, the control module 18, and the power module 19 may be accommodated in an internal space formed between the front surface of the mask body 10 and the rear surface of the mask body cover 20. The control module 18 may be referred to as a first electronic circuit component, and the power module 19 may be referred to as a second electronic circuit component.

The fan modules 16 and 17 may include a fan, a fan motor, and a fan housing accommodating the fan and the fan motor. The fan housing may include a fan suction port through which air flows into the fan and a fan discharge port through which air forcedly flowing by the fan is discharged. The fan may be provided as a centrifugal fan. In this embodiment, the fan modules 16 and 17 may suction air toward the front of the mask body cover 20 and discharge the air toward the side of the mask body 10. The fan may be provided as an axial flow fan or a cross flow fan.

The fan modules 16 and 17 may include a first fan module 16 mounted on the first fan module mounting portion **110*a* and a second fan module 17 mounted on the second fan module mounting portion 110*b*. The first fan module 16 may communicate with the first air suction port 211 and flow into the first air inlet 251 toward the first air suction port 211 to suction the air that has passed through the first filter 23. The second fan module 17 communicates with the second air suction port 221 and flows into the second air inlet 261 toward the second air suction port 221 to suction the air that has passed through the second filter 24. The first fan module 16 communicates with the first air duct portion 120*a* to discharge air into the breathing space, and the second fan module 17 communicates with the second air duct portion 120*b*** to discharge air into the breathing space.

The control module 18 may control the operation of the mask apparatus 1. The control module 18 may be fixed to the control module mounting portion. The control module 18 may operate by receiving power from the battery or the power module 19. The control module 18 may include a communication module and transmit/receive various types of information. The control module 18 may include a data storage module and store various types of information. The control module 18 may control the operation of the fan modules 16 and 17. The control module 18 may control the operation of the fan modules 16 and 17 based on information detected by a sensor. The control module 18 may be electrically connected to and interlocked with the power module 19, the fan modules 16 and 17, and the battery.

The power module 19 may receive power from the outside. The power module 19 may charge the battery. The power module 19 may include a connector 192 and a manipulation portion 195. The power module 19 may control power of the mask apparatus 1 by the manipulation portion 195. The power module 19 may be electrically connected to the control module 18, the fan modules 16 and 17, and the battery to supply power.

The sealing portion 40 may be coupled to the rear surface of the mask body 10 by the sealing bracket 30 and be in close contact with the user's face. The rear surface of the mask body 10 may be spaced apart from the user's face by the sealing portion 40.

The sealing bracket 30 may be formed in a ring shape forming a closed loop. The sealing bracket 30 may be configured such that the sealing portion 40 is detachably coupled. The sealing bracket 30 may be separated from the mask body 10 to clean the sealing portion 40. After coupling the sealing portion 40 to the sealing bracket 30 and then coupling the sealing bracket 30 to the mask body 10, the sealing portion 40 may be firmly fixed to the mask body 10.

The sealing bracket 30 may include a first sealing support portion 301 supporting the sealing portion 40. The first sealing support portion 301 may be formed in a rib shape that is in surface contact with the sealing portion 40. The sealing bracket 30 may be formed in a ring shape forming a closed loop. The first sealing support portion 301 may be formed to extend in a direction from the inside to the outside. The body of the sealing bracket 30 may be formed by the first sealing support portion 301 and the second sealing support portion 302 to be described later. The body of the sealing bracket 30 may be referred to as a sealing bracket body.

The sealing bracket 30 may include a second sealing support portion 302. The second sealing support portion 302 may be formed at one end portion located inside the first sealing support portion 301. The second sealing support portion 302 may extend from one end portion of the first sealing support portion 301 in both directions. The second sealing support portion 302 may support one end portion of the sealing portion 40 supported by the first sealing support portion 301.

When the sealing portion 40 is in contact with the first sealing support portion 301 and the second sealing support portion 302, it can be understood that the sealing portion 40 is closely coupled to the sealing bracket 30. When the sealing bracket 30 is coupled to the mask body 10, the sealing portion 40 may be in close contact with the rear surface of the mask body 10 by the first sealing support portion 301 and the second sealing support portion 302. The second sealing support portion 302 may also perform a rib function for improving durability of the first sealing support portion 301.

The sealing bracket 30 may include a first body coupling portion 304 coupled to the first bracket coupling portion 103. The first body coupling portion 304 may be provided above the sealing bracket 30. The first body coupling portion 304 may be provided in a position and number corresponding to the first bracket coupling portion 103. The first body coupling portion 304 may be referred to as an upper body coupling portion. For example, since the first bracket coupling portion 103 includes the first magnetic member 15, the first body coupling portion 304 may include a second magnetic member.

The sealing bracket 30 may include a second body coupling portion 305 coupled to the second bracket coupling portion 107. The second body coupling portion 305 may be provided below the sealing bracket 30. The second body coupling portion 305 may be provided in a position and number corresponding to the second bracket coupling portion 107. The second body coupling portion 305 may be referred to as a lower body coupling portion. For example, the second body coupling portion 305 may be formed in a hook shape protruding forward from the first sealing support portion 301.

The sealing bracket 30 may include a bracket insertion portion 306 coupled to the mask body 10. The bracket insertion portion 306 may be inserted into the cutout 127 formed in the mask body 10. The cutout 127 may be understood as an opening through which air passes through communication with the air duct 120. The bracket insertion portion 306 may be inserted into one side of the cutout 127. When the bracket insertion portion 306 is inserted into one side of the cutout 127, the other side of the cutout 127 may be defined as the air discharge port 129 through which the air passing through the air duct portion 120 is discharged. When the bracket insertion portion 306 is inserted into one side of the cutout 127 and shields one side of the cutout 127, the air discharged from the fan modules 16 and 17 passes through a portion between the air duct portion 120 and the bracket insertion portion 306 to flow into the air discharge port 129, which is the other side of the cutout 127. The bracket insertion portion 306 may provide a function of fixing the sealing bracket 30 to the mask body 10 while forming one side of the air duct portion 120. The upper portion of the sealing bracket 30 is fixed to the upper portion of the mask body 10 by the first body coupling portion 304, and the lower portion of the sealing bracket 30 is fixed to the lower portion of the mask body 10 by the second body coupling portion 305, and the middle portion of the sealing bracket 30 may be fixed to the middle portion of the mask body 10 by the bracket insertion portion 306.

The sealing bracket 30 may include a sealing insertion portion 307. The sealing insertion portion 307 may be formed in the first sealing support portion 301. A sealing protrusion portion 407 formed on the sealing portion 40 may be inserted into the sealing insertion portion 307. The sealing protrusion portion 407 is inserted into the sealing insertion portion 307 so that the sealing bracket 30 and the sealing portion 40 may be firmly fixed. The sealing insertion portion 307 may be formed by being recessed in a direction from one surface of the first sealing support portion 301 to the other surface thereof. One surface of the first sealing support portion 301 is a front surface in a direction toward the mask body 10, and the other surface of the first sealing support portion 301 may be understood as a surface opposite to the front surface. A plurality of sealing inserts 307 may be provided on the left and right sides with respect to the center of the sealing bracket 30. In this embodiment, the sealing insertion portion 307 may be provided on both sides of the first body coupling portion 304.

The sealing portion 40 may be formed of a material having elasticity. The sealing portion 40 may be deformed to correspond to the user's face in close contact with the user's face. The sealing portion 40 may be formed in a ring shape forming a closed loop. The sealing portion 40 may be formed to cover the user's nose and mouth.

The sealing portion 40 may include a rear portion in contact with the user's face, a front portion in contact with the mask body 10, and a side portion connecting the rear portion and the front portion to form a hollow. A first opening may be included in the front portion of the sealing portion 40 and a second opening may be included in the rear portion of the sealing portion 40. The air discharge port 129 and the air outlets 154 and 155 may be located inside the first opening, and the user's nose and mouth may be located inside the second opening.

The sealing portion 40 is located between the user's face and the mask body 10, and a breathing space for breathing is defined on the inside of the front portion, the rear portion, and the side portion connecting the front portion and the rear portion of the sealing portion 40.

The sealing portion 40 may include a sealing packing portion 401. The sealing packing portion 401 may be in contact with the first sealing support portion 301 and the second sealing support portion 302 of the sealing bracket 30. The sealing packing portion 401 may be defined as a portion of the front portion of the sealing portion 40. The sealing packing portion 401 may be located between the sealing bracket 30 and the rear surface of the mask body 10 to block a gap formed between the sealing bracket 30 and the rear surface of the mask body 10.

The sealing packing portion 401 may include a sealing protrusion portion 407. The sealing protrusion portion 407 may be formed on the sealing packing portion 401. The sealing protrusion portion 407 may protrude from the front surface portion of the sealing portion 40 toward the rear surface portion of the sealing portion 40. The sealing protrusion portion 407 may be formed in a cylindrical or tapered shape. The sealing protrusion portion 407 may be inserted into the sealing insertion portion 307. The sealing protrusion portions 407 may be provided in positions and numbers corresponding to the sealing insert portions 307. The sealing insertion portion 307 is inserted into the sealing protrusion portion 407, and the sealing portion 40, the first sealing support portion 301, and the second sealing support portion 302 may be coupled.

The sealing portion 40 may include a first seating portion 404 on which the first body coupling portion 304 is seated, a second seating portion 405 on which the second body coupling portion 305 is seated, and a third seating portion 406 on which the bracket insertion portion 306 is seated. The seating portions 404, 405, and 406 may be understood as a configuration that opens a portion of the sealing portion 40 to form a seating space in which the first body coupling portion 304, the second body coupling portion 305, and the bracket insertion portion 306 are seated. The seating portions 404, 405, and 406 may be changed to a seating groove, a through-hole, or the like, depending on the shapes thereof. In this embodiment, it is referred to as an opening. The opening may be formed on a front side of the sealing portion 40.

For example, the sealing portion 40 may include a first opening 306 in which the first body coupling portion 304 is seated, a second opening 406 in which the bracket insertion portion 306 is seated, and a third opening 405 through which the second body coupling portion 305 passes. The first and second openings 404 and 406 may be formed in numbers and positions corresponding to the first body coupling portion 304 and the bracket insertion portion 306. The third opening 405 may be formed in a number and position corresponding to the second body coupling portion 305.

When the first body coupling portion 304, the second body coupling portion 305, and the bracket insertion portion 306 are inserted into the first and second openings 404 and 406 and the third opening 405, the sealing portion 40 and the sealing bracket 30 can be closely coupled.

Figure 6:
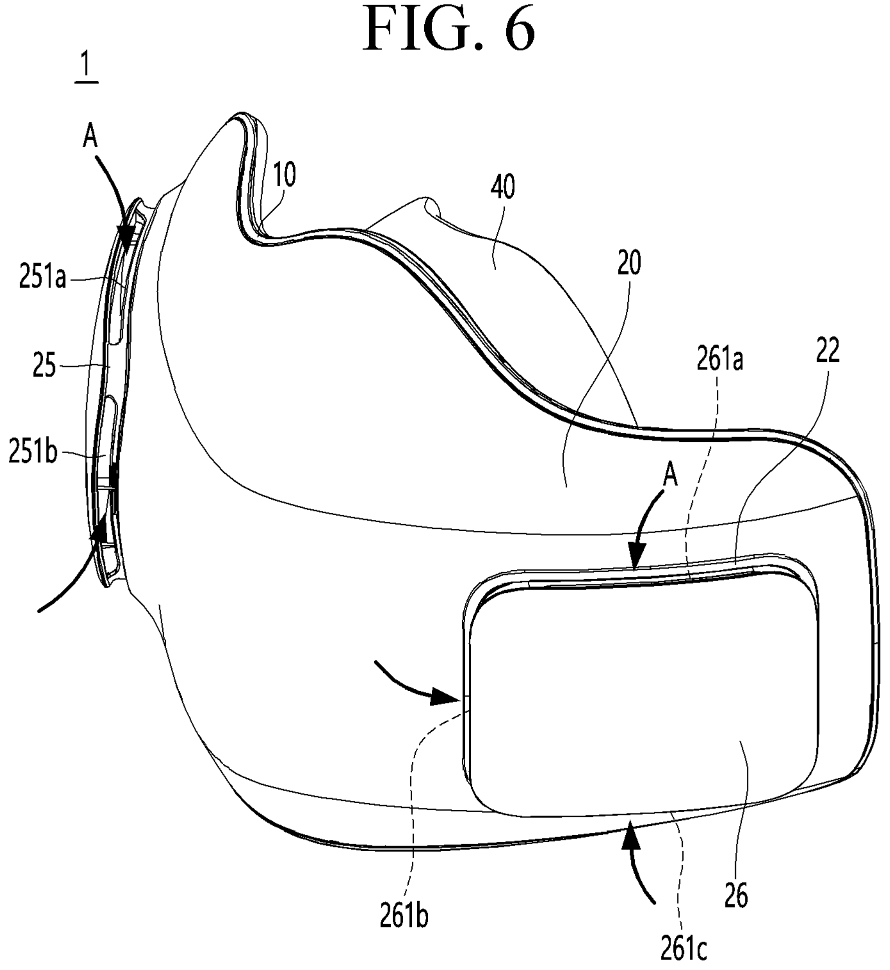
FIGS. 6 and 7 are views illustrating the flow of air when operating the mask apparatus according to an embodiment of the present disclosure.
Figure 7:
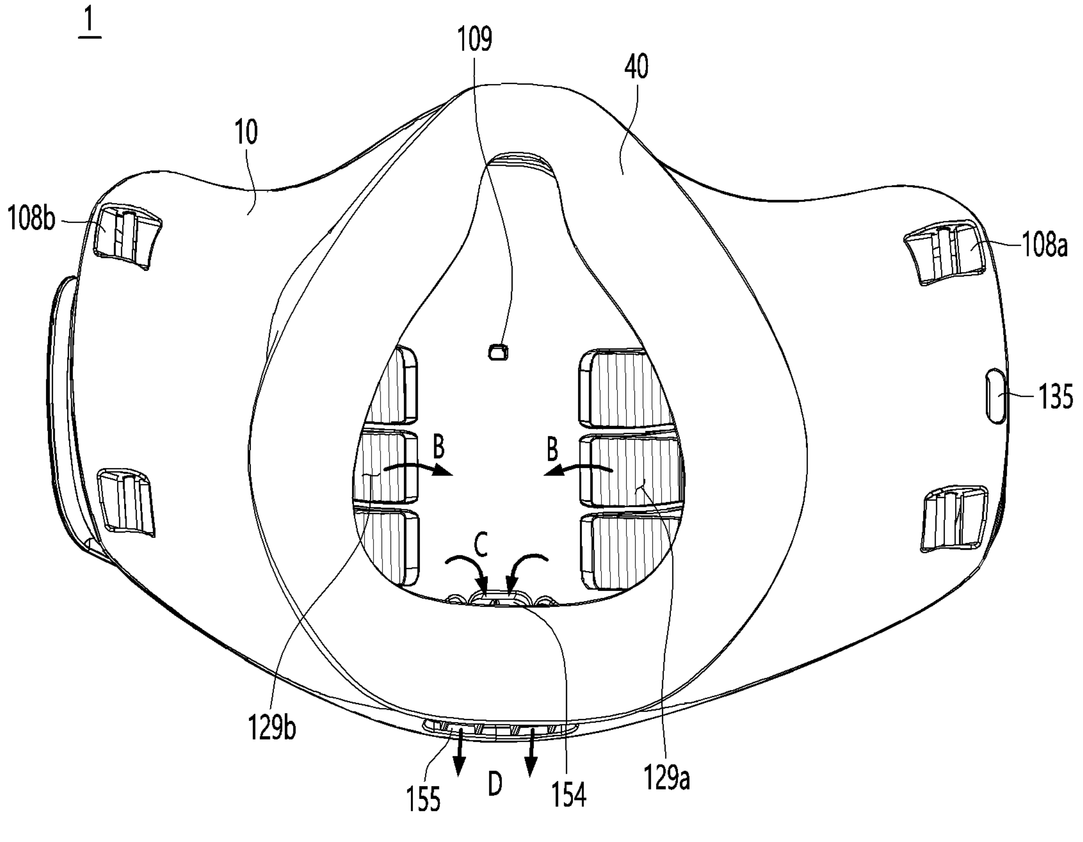

Referring to FIGS. 6 and 7, the mask apparatus 1 according to the present disclosure may suction in external air through air inlets 251 and 261 formed in filter covers 25 and 26. A flow direction of external air suctioned into the mask apparatus 1 is indicated by A. Since a plurality of air inlets 251 and 261 are provided so that air suctions in various directions, an inflow amount of external air can be increased. For example, the air inlets 251 and 261 may include air inlets 251*a* and 261*a* for suctioning air from above the mask apparatus 1, air inlets 251*b*, 261*b* for suctioning air from the front of the mask apparatus 1, and air inlets 251*c* and 261*c* for suctioning air from below the mask apparatus 1. Since the filter covers 25 and 26 in which the air inlets 251 and 261 are formed are disposed on both sides of the mask apparatus 1, respectively, external air can be smoothly suctioned in from both sides of the mask apparatus 1.

External air flowing therein through the air inlets 251 and 261 may be filtered of foreign substances by the filters 23 and 24 positioned inside the filter covers 25 and 26 and the filter mounting portions 21 and 22. The filters 23 and 24 can be replaced when the filter covers 25 and 26 are separated from the mask apparatus 1.

The air passing through the filters 23 and 24 may flow into the fan suction ports of the fan modules 16 and 17 through the air suction ports 211 and 221. Since the filter mounting portions 21 and 22 where the air suction port 211 and 221 are formed and the fan modules 16 and 17 are in close contact with each other, leakage of filtered air or inflow of external air can be prevented.

Air discharged through the fan discharge ports of the fan modules 16 and 17 may pass through the air duct portion 120 and then flow into the breathing space through the air discharge port 129. A flow direction of air flowing into the breathing space through the air discharge port 129 is indicated by B. The breathing space may be defined by the mask body 10 and the sealing portion 40. When the mask body 10 is mounted on the user's face, the sealing portion 40 is in close contact with the mask body 10 and the user's face to form an independent breathing space separated from the external space.

The filtered air supplied through the air discharge port 129 may be suctioned in by the user, and the air exhaled by the user may be discharged to an external space through the air outlets 154 and 155. The air outlets 154 and 155 include a first air outlet 154 communicating with the breathing space and a second air outlet 155 communicating with the external space, the first air outlet 154 and the second air outlet 155 may communicate with each other by means of a flow space. Air exhaled by the user may flow into the flow space through the first air outlet 154. A flow direction of air flowing into the flow space through the first air outlet 154 is indicated by C.

The air flowing into the flow space through the first air outlet 154 may be discharged to an external space through the second air outlet 155. A flow direction of air flowing into the external space through the second air outlet 155 is indicated by D. At least one of the first air outlet 154 and the second air outlet 155 is provided with a check valve, and it is possible to prevent external air from flowing backward into the breathing space.

Figure 8:
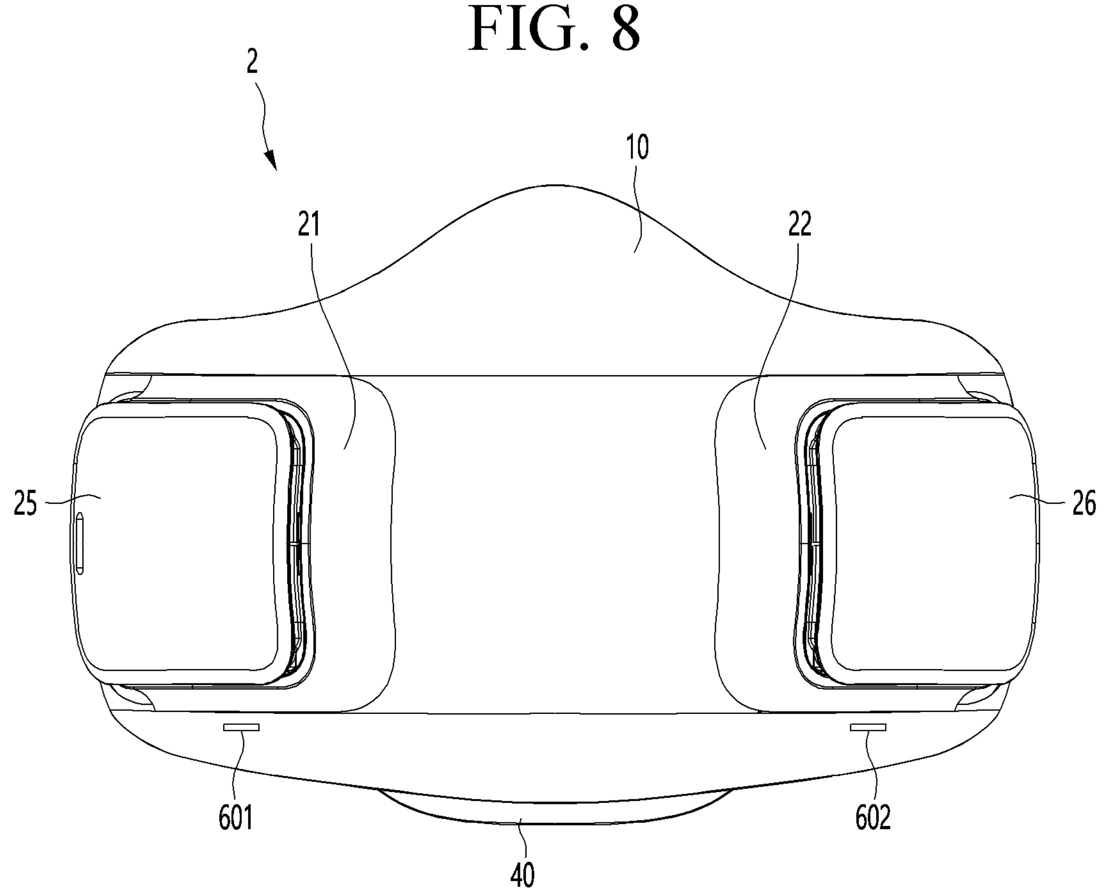
FIG. 8 is a front view illustrating a main portion of a mask apparatus according to an embodiment of the present disclosure.
Figure 9:
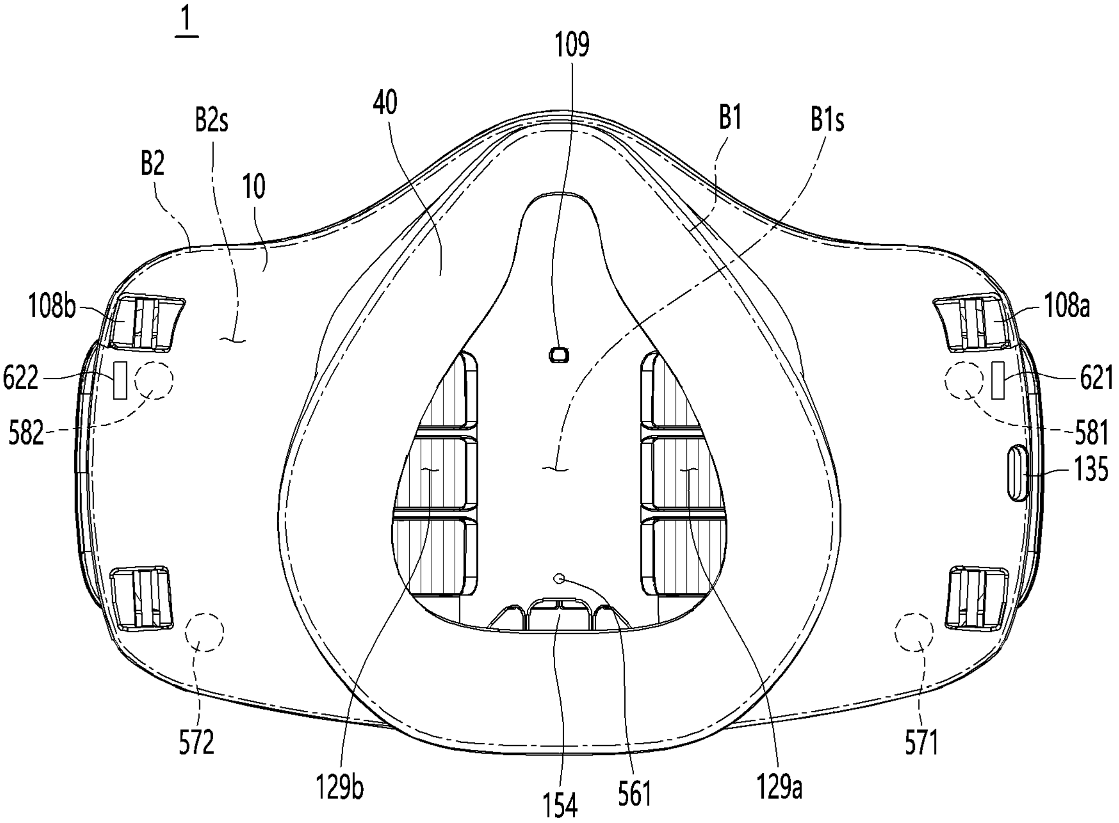
FIG. 9 is a rear view illustrating a main portion of a mask apparatus according to an embodiment of the present disclosure.
Figure 10:
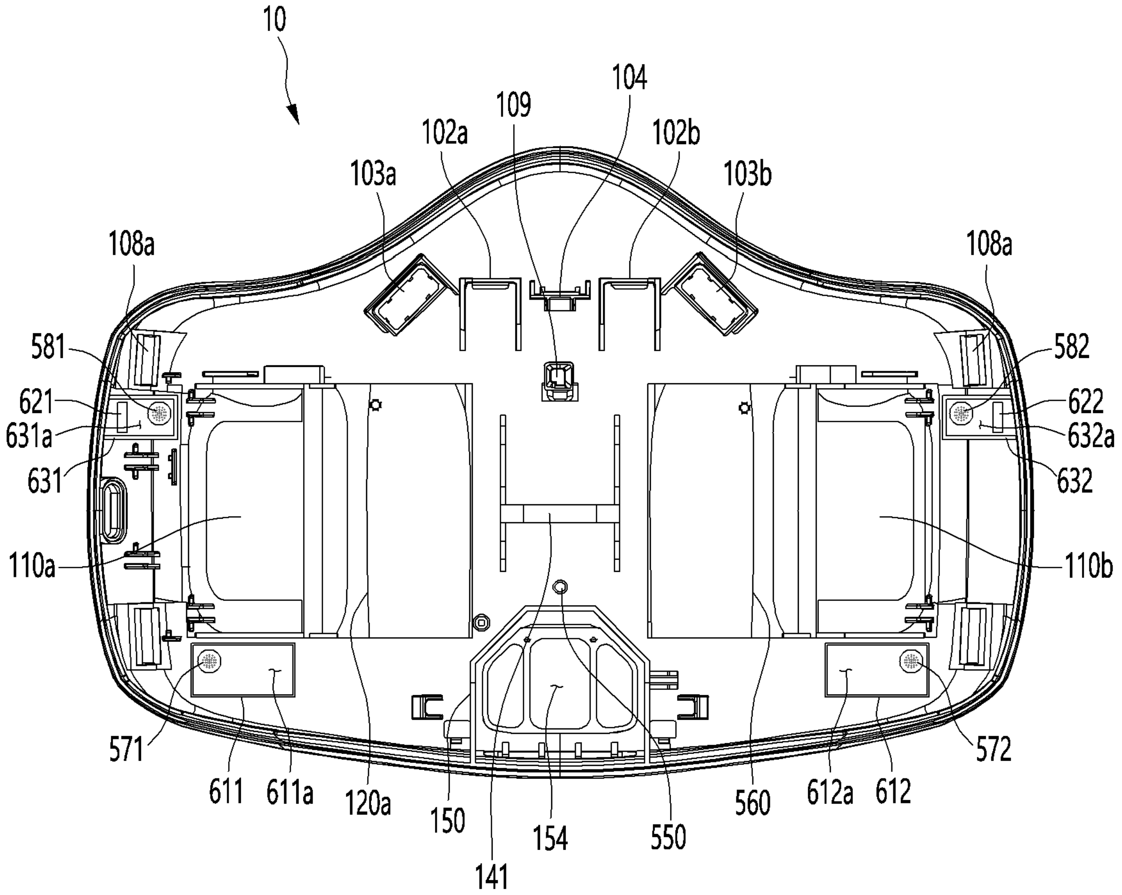
FIG. 10 is a view illustrating a main portion of a mask body according to an embodiment of the present disclosure.
Figure 11:
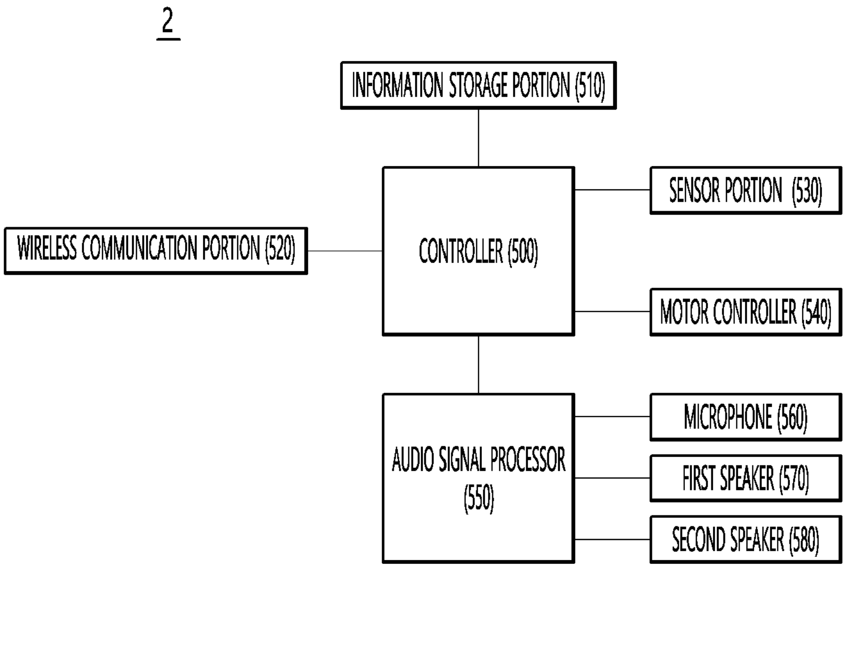
FIG. 11 is a configuration diagram illustrating a mask apparatus according to an embodiment of the present disclosure.

FIG. 8 is a front view illustrating a main portion of a mask apparatus according to an embodiment of the present disclosure, FIG. 9 is a rear view illustrating a main portion of a mask apparatus according to an embodiment of the present disclosure, FIG. 10 is a view illustrating a main portion of a mask body according to an embodiment of the present disclosure, and FIG. 11 is a configuration diagram illustrating a mask apparatus according to an embodiment of the present disclosure.

Referring to FIGS. 8 to 11, the mask apparatus 2 according to an embodiment of the present disclosure may include an audio signal processor 550. When the mask apparatus 2 is worn on the user's face, there is a problem in that the user's speaking sound is not transmitted to the outside by the mask apparatus 2. The audio signal processor 550 can transmit the user's speaking sound to the outside even when the mask apparatus 2 is worn on the user's face. With the audio signal processor 550, it is possible to have a conversation with another person in a state of wearing the mask apparatus 2.

The audio signal processor 550 may include a microphone 560 and speakers 570 and 580. The microphone 560 may receive input of a user's speaking sound. The speakers 570 and 580 may output sound to the outside. Sound which is capable of outputting from the speakers 570 and 580 may include sound input to the microphone 560, sound previously stored in the information storage portion 510, sound received through the wireless communication portion 520, and the like.

The speakers 570 and 580 of the audio signal processor 550 may include a first speaker 570 and a second speaker 580. The first speaker 570 may output sound input through the microphone 560 to the outside. The second speaker 580 may output sound information previously stored in the information storage portion 510, sound information received through the wireless communication portion 520, or the like. The first speaker 570 may output sound toward the front of the mask apparatus 2, and the second speaker 580 may output sound toward the user's ears. In this embodiment, the sound output from the speakers 570 and 580 can be output in a loud voice by allowing the sound to pass through the resonance space. The resonance space may be formed in a preset size in which resonance may occur in the sound output from the speakers 570 and 580. In other words, the sound output from the speakers 570 and 580 may be transformed into a louder sound than the sound output from the speakers 570 and 580 by resonating while passing through the resonance space.

The mask body cover 20 may include a first resonance opening 600 for outputting sound toward the front of the mask apparatus 2. The first resonance opening 600 may be formed by opening a portion of the mask body cover 20. The first resonance opening 600 can be understood as an opening through which sound output from the first speaker 570 is output to an external space after resonance. In this embodiment, the first resonance opening 600 may be formed in the lower portion of the mask body cover 20. A plurality of first resonance openings 600 may be formed. The plurality of first resonance openings 600 may be symmetrically disposed on both sides with respect to the center of the mask body cover 20. The first resonance opening 600 may include a first resonance opening 601 on one side disposed on the right side of the mask body cover 20 and a first resonance opening 602 on the other side disposed on the left side of the mask body cover 20. Since the first resonance opening 600 outputs sound toward the front, it is possible to have a face-to-face conversation with another person even in a state of wearing the mask apparatus 2. The first resonance opening 600 may be referred to as a front opening.

The mask body 10 may include a second resonance opening 620 that outputs sound backward toward the user's ear. The second resonance opening 620 may be formed by opening a portion of the mask body 10. The second resonance opening 620 may be understood as an opening through which the sound output from the second speaker 580 is output toward the user's ear after resonance. In this embodiment, the second resonance opening 620 may be formed adjacent to both end portions of the mask body 10. A plurality of second resonance openings 620 may be formed. The plurality of second resonance openings 620 may be symmetrically disposed on both sides with respect to the center of the mask body 10. The second resonance opening 620 may include a second resonance opening 621 on one side disposed on the right side of the mask body 10 and a second resonance opening 622 on the other side disposed on the left side of the mask body 10. Since the second resonance opening 620 outputs sound toward the user's ear, sound can be efficiently transmitted to the user's ear in a state of wearing the mask apparatus 2. The second resonance opening 620 may be referred to as a side opening.

The speakers 570 and 580 may be mounted on any one of the mask body 10 and the mask body cover 20. In this embodiment, the first speaker 570 and the second speaker 580 are described as being mounted on the mask body 10, but may also be mounted on the mask body cover 20.

The mask body 10 may include first space forming portions 611 and 612 forming first resonance spaces 611*a* and 612*a* for resonating the sound output from the first speaker 570, and second space forming portions 631 and 632 forming second resonance spaces 631*a* and 632*a* for resonating sound output from the second speaker 580. The sound output from the first speaker 570 may resonate and be amplified within the first resonance spaces 611*a* and 612*a*. The sound output from the second speaker 580 may resonate and be amplified in the second resonance spaces 631*a* and 632*a*.

The first space forming portions 611 and 612 and the second space forming portions 631 and 632 may protrude forward from the mask body 10. The first space forming portions 611 and 612 may be located on at least one of upper and lower portions of the mask body 10, and the second space forming portions 631 and 632 are located on at least one of both side portions of the mask body 10. For example, the first space forming portions 611 and 612 are disposed at lower portions of both sides with respect to the center of the mask body 10, and the second space forming portions 631 and 632 may be disposed at both sides with respect to the center of the mask body 10. The first space forming portions 611 and 612 and the second space forming portions 631 and 632 may be formed on the mask body cover 20 or on the mask body 10 and the mask body cover 20, respectively.

The first space forming portions 611 and 612 may include a first space forming portion 611 on one side disposed on the right side of the mask body 10 and a first space forming portion 612 on the other side disposed on the left side of the mask body 10. A first resonance space 611*a* on one side may be formed inside the first space forming portion 611 on one side, and a first resonance space 612*a* on the other side may be formed inside the first space forming portion 612 on the other side.

A first speaker 571 on one side may be provided in the first resonance space 611*a* on one side, and a first speaker 572 on the other side may be provided on the first resonance space 612*b* on the other side. A second speaker 581 on one side may be provided in the second resonance space 631*a* on one side, and a second speaker 582 on the other side may be provided on the second resonance space 632*a* on the other side.

The first space forming portions 611 and 612 may form first resonance spaces 611*a* and 612*a* having sizes set so that sound output from the first speaker 570 can be amplified by resonance. The second space forming portions 631 and 632 may form second resonance spaces 631*a* and 632*a* having sizes set so that sound output from the second speaker 580 can be amplified by resonance.

In this embodiment, the first space forming portions 611 and 612 and the second space forming portions 631 and 632 may form the first resonance space 611*a*, 612*a*) and the second resonance spaces 631*a* and 632*a* which are sealed when the mask body 10 and the mask body cover 20 are coupled. The first resonance spaces 611*a* and 612*a* may communicate with an external space through the first resonance opening 600. The second resonance spaces 631*a* and 632*a* may communicate with the external space through the second resonance opening 620.

In other words, the sound output from the first speaker 570 may be amplified by resonance in the first resonance spaces 611*a* and 612*a* and then transmitted to the external space through the first resonance opening 600. The sound output from the second speaker 580 may be amplified by resonance in the second resonance spaces 631*a* and 632*a* and then transmitted toward the user's ear through the second resonance opening 620.

The first space forming portions 611 and 612 and the second space forming portions 631 and 632 may be formed in a plurality of rib shapes protruding from the mask body 10. The first resonance spaces 611*a* and 612*a* may be located inside the first space forming portions 611 and 612, and the second resonance spaces 631*a* and 632*a* may be located inside the second space forming portions 631 and 632. The first space forming portions 611 and 612 may include a plurality of ribs, and the plurality of ribs may be connected to form the first resonance spaces 611*a* and 612*a*. The second space forming portions 631 and 632 may also include a plurality of ribs, and the plurality of ribs may be connected to form the second resonance spaces 631*a* and 632*a*.

The mask body 10 may include a microphone 560. The microphone 560 may receive a user's voice in a state of wearing the mask apparatus 2. The microphone 560 may be located on a breathing space formed inside the sealing portion 40. A mask hole 561 for installing the microphone 560 may be formed in the mask body 10. In this embodiment, the microphone 560 may be fixed to the mask body 10 and may be installed to be exposed to the breathing space. The microphone 560 may be located above the air discharge portion 150. When the microphone 560 may be located in front of the user's mouth, the user's voice may be more accurately recognized.

Meanwhile, the mask apparatus 2 according to the present disclosure may include a controller 500. The controller 500 may control the operation of the mask apparatus 2. The controller 500 may be provided as a circuit board for controlling the operation of the mask apparatus 2. The controller 500 may control the operation of components constituting the mask apparatus 2. The controller 500 may be installed inside the mask apparatus 2.

The mask apparatus 2 may include an information storage portion 510. A plurality of pieces of information may be stored in the information storage portion 510. The information storage portion 510 may store sound input through the microphone 560, sound information transmitted through the wireless communication portion 520, and previously stored sound information.

The mask apparatus 2 may include a wireless communication portion 520. The wireless communication portion 520 may receive multiple pieces of information or transmit multiple pieces of information. A plurality of pieces of information may be received from a terminal or a server through the wireless communication portion 520. A plurality of pieces of information received through the wireless communication portion 520 may be stored in the information storage portion 510. A plurality of pieces of information may be transmitted to a terminal or a server through the wireless communication portion 520. At this time, the plurality of pieces of information transmitted through the wireless communication portion 520 may include state information of the mask apparatus 2, sound input through the microphone 560, and a plurality of pieces of information stored in the information storage portion 510.

The mask apparatus 2 may include a sensor portion 530. The sensor portion 530 may collect state information of the mask apparatus 2. The sensor portion 530 may include a sensor that collects information about the breathing space, a sensor that collects information about the operation of the mask apparatus 2, and the like. For example, the sensor portion 530 may detect the pressure of the breathing space to determine whether the user is breathing. In addition, the sensor portion 530 can check the operating state of the fan module, the life state of the filter module, and the like. Sensing information sensed by the sensor portion 530 may be stored in the information storage portion 510.

The mask apparatus 2 may include a motor controller 540. The motor controller 540 may control the operation of the fan module. The motor controller 540 may adjust the rotational speed of the fan module. The motor controller 540 may receive an operation signal from the controller 500 and control the operation of the fan module.

The mask apparatus 2 may include an audio signal processor 550. The audio signal processor 550 may handle the sound output from the mask apparatus 2 and the sound input to the mask apparatus 2. The audio signal processor 550 may include a microphone 560 and speakers 570 and 580. The speakers 570 and 580 may include a first speaker 570 and a second speaker 580. The audio signal processor 550 may process sounds input to the microphone 560 and sounds output to the speakers 570 and 580. The audio signal processor 550 may collect sound input to the microphone 560 and output the collected sound to the first speaker 570. Also, the audio signal processor 550 may output sound information stored in the information storage portion 510 to the second speaker 580.

Figure 12:
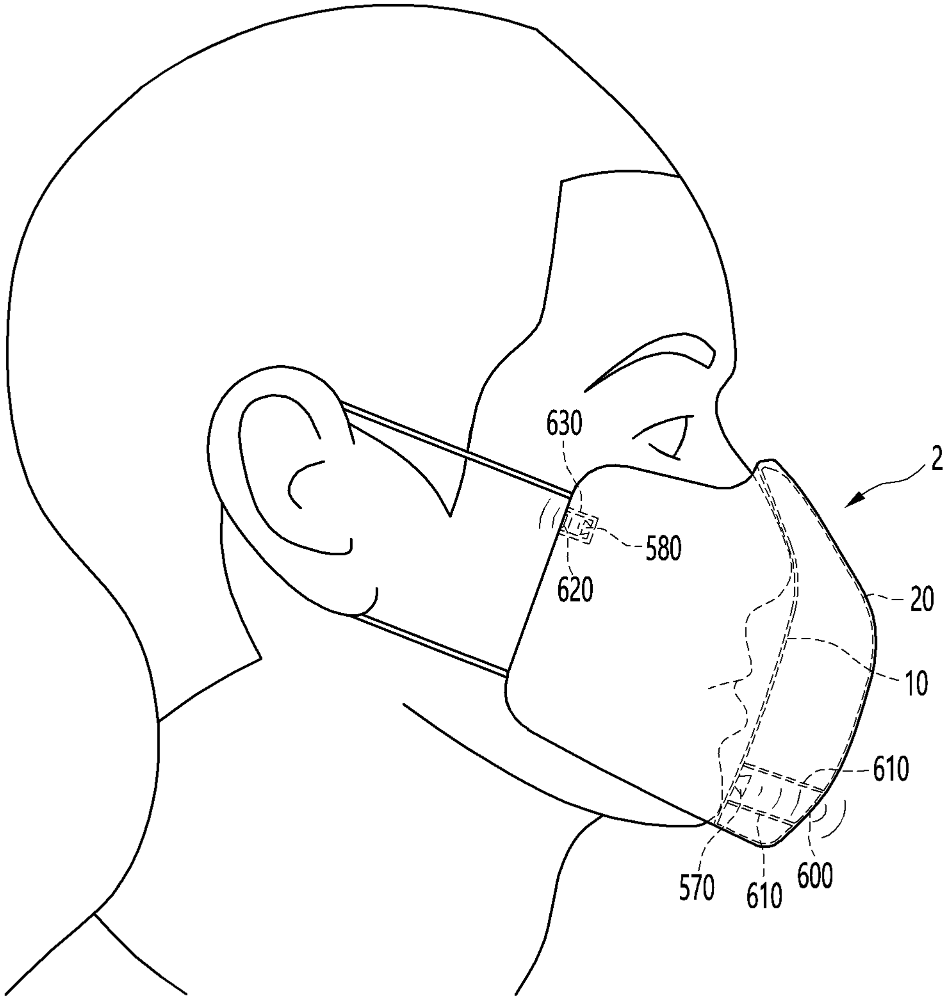
FIG. 12 is a view illustrating a state of wearing a mask apparatus according to an embodiment of the present disclosure.

FIG. 12 is a view illustrating a state of wearing a mask apparatus according to an embodiment of the present disclosure.

Referring to FIG. 12, the mask apparatus 2 according to the present disclosure may be worn on a user's face. A user may receive filtered air through the mask apparatus 2. When a user speaks in a state of wearing the mask apparatus 2, sound may be input through the microphone 560 of the mask apparatus 2.

Sound input through the microphone 560 may be stored in the information storage portion 510. Based on the sound information stored in the information storage portion 510, the controller 500 can control the first speaker 570. The controller 500 outputs the sound input through the microphone 560 to the first speaker 570 so that the sound spoken by the user can be transmitted to the external space. The controller 500 may determine the frequency of the sound input to the microphone 560 through the audio processing signal unit 550 and adjust the frequency of the sound output from the first speaker 570. At this time, the frequency of the sound output from the first speaker 570 can be adjusted to the frequency of sound that can cause resonance in the first resonance spaces 611*a* and 612*a*. The sound amplified in the first resonance spaces 611*a* and 612*a* may be output to an external space through the first resonance opening 600. Since the first resonance opening 600 is provided in the mask body cover 20, sound can be quickly transmitted to the front of the mask apparatus 2.

The mask apparatus 2 may transmit and receive sound information to and from a terminal or server through the wireless communication portion 520. Sound information received through the wireless communication portion 520 may be stored in the information storage portion 510. The controller 500 may output sound through the second speaker 580 based on the sound information stored in the storage device. For example, the controller 500 may output music sound to the second speaker 580 through the audio signal processor 550. The audio signal processor 550 may transform the frequency of the sound output through the second speaker 580 into a frequency that can be resonated in the second resonant spaces 631*a* and 632*a* and output the converted sound. A sound having a higher frequency than the frequency of the sound output through the second speaker 580 may be output through the second resonance opening 620.

The mask apparatus 2 may enable voice communication through the wireless communication portion 520, the microphone 560, and the second speaker 580. The controller 500 may transmit and receive sound information to and from the terminal through the wireless communication portion 520. A user's sound may be received through the microphone 560 and the received sound may be transmitted to the terminal through the wireless communication portion 520. Sound information received from the terminal to the wireless communication portion 520 may be output through the second speaker 580.

In other words, the user can enjoy music in a state of wearing the mask apparatus 2. In addition, the user may make a phone call in a state of wearing the mask apparatus 2. In addition, the user may be able to communicate with others in a state of wearing the mask apparatus 2. In addition, the mask apparatus 2 may modify the frequency of the output sound so that the sound is output with a higher frequency. In other words, since the output of the speakers 570 and 580 can be adjusted while outputting a loud sound using resonance, the power efficiency of the mask apparatus 2 can be improved.

Meanwhile, the mask apparatus 2 according to the present disclosure may include a first boundary region B1 formed in the sealing portion 40 forming a breathing space, and a second boundary region B2 located outside the breathing space and formed in a flange of the mask body 10.

A breathing space is located in the first boundary region B1, and an enclosed space distinguished from the external space may be formed. A space formed by the first boundary region B1 may be referred to as a first boundary space B1*s*. The user's nose and mouth are located in the first boundary space B1*s*, and the microphone 560 may be located inside the first boundary space B1*s*. The first boundary space B1*s* is located in front of the user's nose and mouth, and components for supplying air to the breathing space may be located.

The second boundary area B2 is located outside the sealing portion 40 and may form a separate space distinguished from the first boundary area B1. A space formed by the second boundary area B2 may be referred to as a second boundary space B2*s*. The second boundary space B2*s* may be located between the first boundary area B1 and the second boundary area B2. The second boundary space B2*s* may be located in front of the user's cheekbones and both cheeks. Speakers 570 and 580 may be located in the second boundary space B2*s*. Since the speakers 570 and 580 are installed in the second boundary space B2*s*, weight distribution on both sides of the mask apparatus 2 can be uniformly adjusted. By forming a resonance space in the second boundary space B2*s*, the structure of the mask apparatus 2 can be optimally disposed. In this embodiment, a plurality of second boundary space B2*s* may be provided on both sides of the first boundary space B1*s*.

Figure 13:
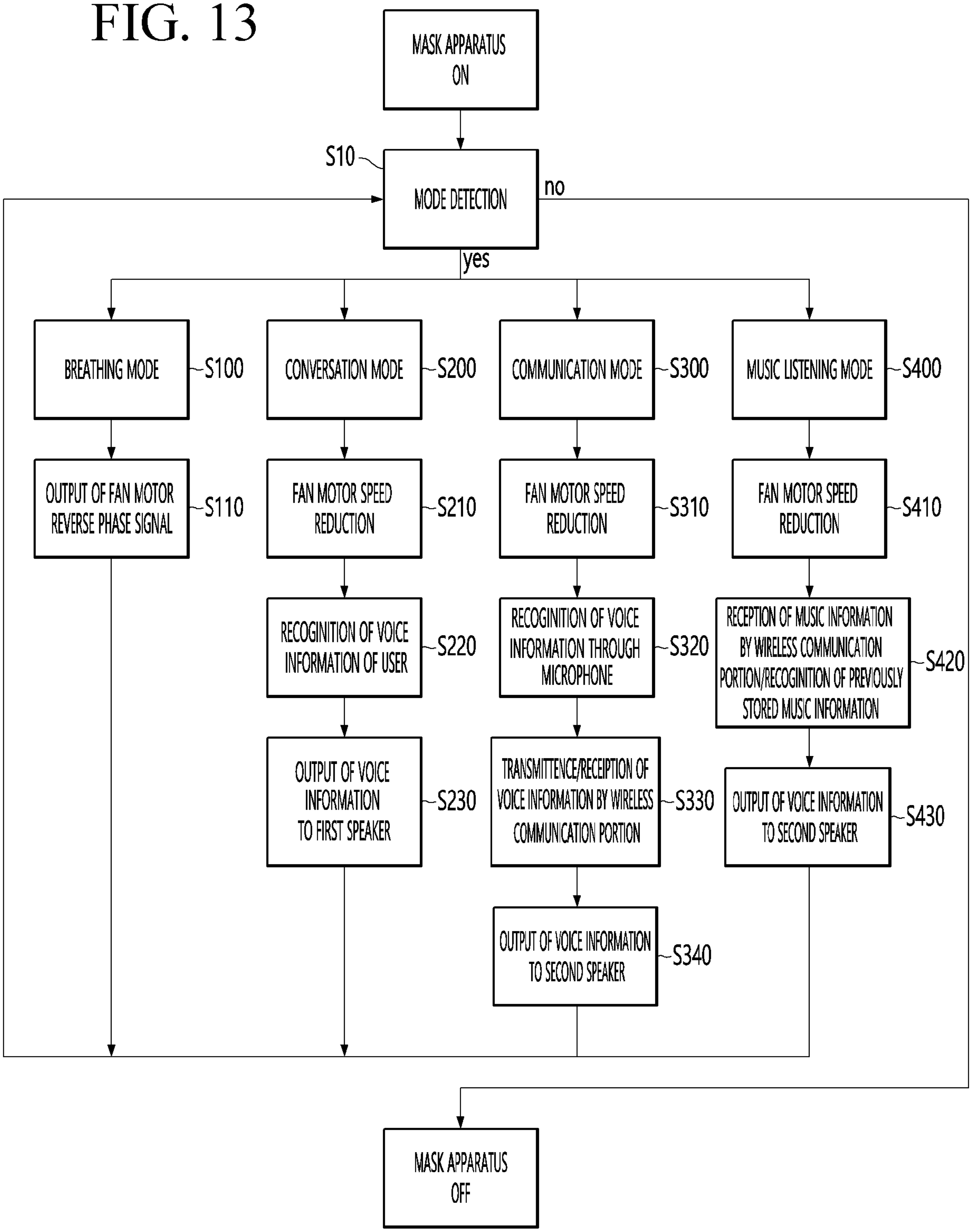
FIG. 13 is an operational flow chart illustrating a mask apparatus according to an embodiment of the present disclosure.

FIG. 13 is an operational flow chart illustrating a mask apparatus according to an embodiment of the present disclosure.

Referring to FIG. 13, the mask apparatus 2 according to an embodiment of the present disclosure may operate in multiple modes. When the mask apparatus 2 is turned on, an operating mode can be detected (S1).

Detecting the operating mode may be understood as determining an operating mode based on the sensing information detected by the sensor portion 530 of the mask apparatus 2 by the controller 500 of the mask apparatus 2, the sound information processed by the audio signal processor 550, or the like (S10). The sensing information may include user breathing information, operation signal information of a fan module, and the like.

When the operation sound of the fan module is input to the microphone 560 of the audio signal processor 550 and the operation of the fan module of the mask apparatus 2 is detected by the sensor portion 530, the breathing mode (S100) can work (S110). It may be determined that the breathing mode (S100) is a state where no sound is input from the user and the user concentrates on breathing.

Alternatively, the user may directly control the operation of the mask apparatus 2 to select the breathing mode (S100). In addition, the user may select an operation mode by calling a breathing mode.

Since the user is concentrating on breathing in the breathing mode (S100), the sound generated by the fan module of the mask apparatus 2 may be transmitted as a loud noise to the user's ears.

In the breathing mode (S100), the controller 500 may output antiphase sound information corresponding to the sound of the fan module from the second speaker 580 based on the sound of the fan module input to the microphone 560 (S120).

Since the second speaker 580 outputs antiphase sound information corresponding to the sound of the fan module, the operation sound generated by the fan module can be canceled by the antiphase sound information. Through this, the operation sound of the fan module may be restricted from being transmitted to the user's ears.

When sound is input from the user to the microphone 560 of the audio signal processor 550 and the operation of the fan module of the mask apparatus 2 is detected by the sensor portion 530, the conversation mode (S200) may be activated (S200).

Alternatively, the user may directly control the operation of the mask apparatus 2 and select the conversation mode (S200). In addition, the user may select an operation mode by calling a conversation mode.

When the mask apparatus 2 operates in the conversation mode (S200), the rotation speed of the fan module of the mask apparatus 2 may be reduced (S210). Operational noise of the fan module that may be generated by the fan module may be minimized by reducing the rotation speed of the fan module. In addition, it is possible to prevent excessive supply of air by the fan module when a user has a conversation.

After the rotation speed of the fan module decreases, the user's sound can be received through the microphone 560 (S220). The user's voice input through the microphone 560 may be stored in the information storage portion 510 of the mask apparatus 2. The controller 500 can determine frequency information of the user's sound based on the sound information stored in the information storage portion 510. When the frequency of the sound input from the user is low, the controller 500 can recognize accurate sound information by amplifying the frequency of the sound.

The user's sound input through the microphone 560 may be output through the first speaker 570 (S230). The sound output through the first speaker 570 may be output as an amplified sound by resonating in the first resonance spaces 611*a* and 612*a* of the mask apparatus 2. The controller 500 may adjust the frequency of the sound output from the first speaker 570 so that the sound output from the first speaker 570 can be amplified in the first resonance spaces 611*a* and 612*a*, and may outputs the sound.

When the wireless communication portion 520 of the mask apparatus 2 transmits and receives sound information to and from the terminal, sound is input from the user to the microphone 560 of the audio signal processor 550, and the operation of the fan module of (2) is detected by the sensor portion 530, the communication mode (S300) may operate (S300).

Alternatively, the user may directly control the operation of the mask apparatus 2 to select the communication mode (S300). In addition, the user may select an operation mode by calling the communication mode.

When the mask apparatus 2 operates in the communication mode (S300), the rotation speed of the fan module of the mask apparatus 2 may be reduced (S310). Operational noise of the fan module that may be generated by the fan module may be minimized by reducing the rotation speed of the fan module. In addition, it is possible to prevent excessive supply of air by the fan module when a user has a conversation.

After the rotation speed of the fan module decreases, the user's sound can be received through the microphone 560 (S320). The user's sound input through the microphone 560 may be stored in the information storage portion 510 of the mask apparatus 2.

The user's sound information stored in the information storage portion 510 is transmitted to the terminal by the wireless communication portion 520, and the sound information of the terminal may be received by the wireless communication portion 520 to the information storage portion 510 (S330). The terminal may communicate with the wireless communication portion 520 to transmit and receive sound information. The sound information of the terminal transmitted through the wireless communication portion 520 and the sound input from the microphone 560 may be stored in the information storage portion 510.

The controller 500 may output the sound information of the terminal and the user's sound stored in the information storage portion 510 to the second speaker 580 (S340).

Sound input through the microphone 560 may be transmitted to the terminal, and sound information transmitted from the terminal may be transmitted to the mask apparatus 2 and transmitted to the second speaker 580 through a communication network in real time. The second speaker 580 further outputs the user's sound, so that it can be confirmed whether the user's voice is transmitted to the other party on the call. The mask apparatus 2 can communicate with a terminal, allowing a user to make a phone call in a state of wearing the mask apparatus 2.

Sound information about music is previously stored in the information storage portion 510, or sound information about music is transmitted through the wireless communication portion 520, and when an operation of the fan module of the mask apparatus 2 is detected by the sensor portion 530, the music listening mode (S400) may operate (S400).

Alternatively, the user may directly control the operation of the mask apparatus 2 to select the music listening mode (S400). In addition, the user may call a music listening mode to select an operation mode.

When the mask apparatus 2 operates in the music listening mode (S400), the rotation speed of the fan module of the mask apparatus 2 may decrease (S410). Operational noise of the fan module that may be generated by the fan module may be minimized by reducing the rotation speed of the fan module.

Sound information about music may be received from a terminal or a server through the wireless communication portion 520 (S420). Sound information about music received through the wireless communication portion 520 is stored in the information storage portion 510, and the stored music information can be recognized by the controller 500. Alternatively, information on music previously stored in the information storage portion 510 may be recognized by the controller 500.

When the sound information about the music is recognized, the controller 500 can output the sound information about the music to the second speaker 580. The controller 500 may adjust the frequency of the sound output from the second speaker 580 so that the sound is amplified in the second resonance spaces 631*a* and 632*a* and output to the external space.

Meanwhile, when the operation mode is not detected, the operation of the mask apparatus 2 is turned off to save power of the mask apparatus 2.

Figure 14:
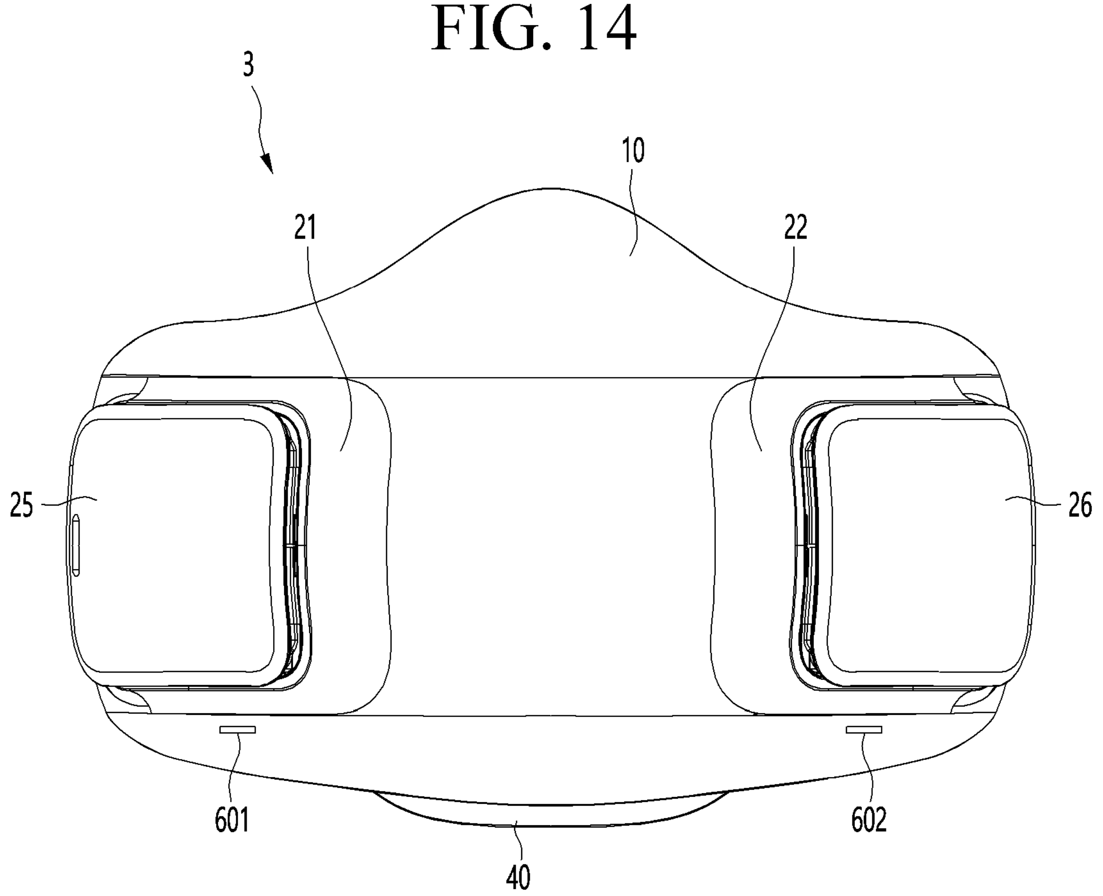
FIG. 14 is a front view illustrating a main portion of a mask apparatus according to another embodiment of the present disclosure.
Figure 15:
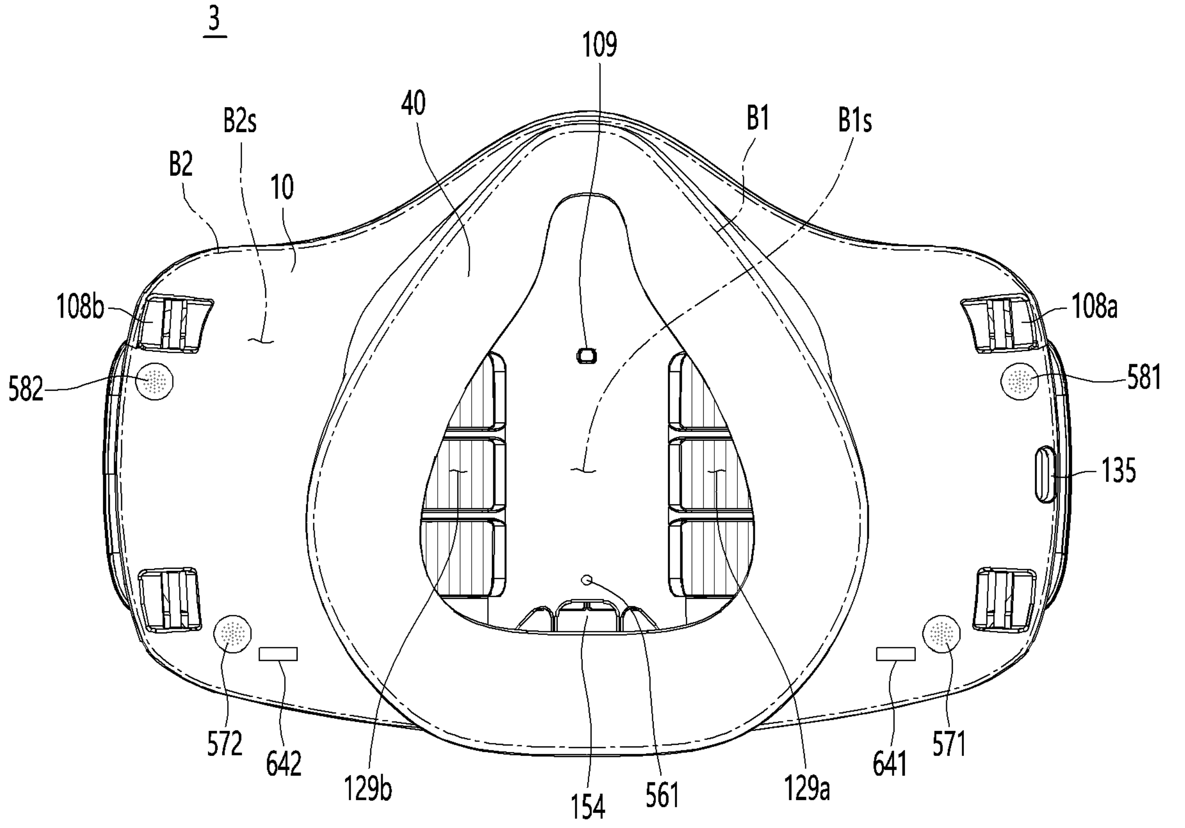
FIG. 15 is a rear view illustrating a main portion of a mask apparatus according to another embodiment of the present disclosure.
Figure 16:
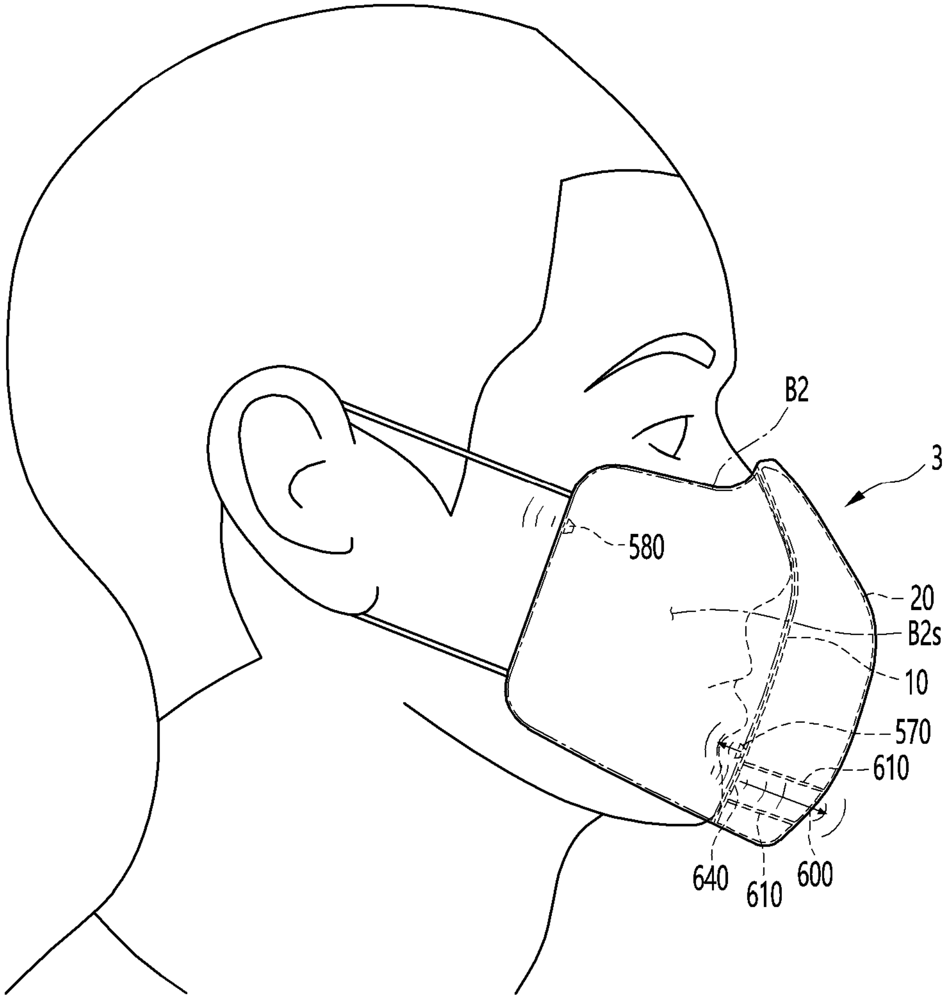
FIG. 16 is a view illustrating a state of wearing a mask apparatus according to another embodiment of the present disclosure.

FIG. 14 is a front view illustrating a main portion of a mask apparatus according to another embodiment of the present disclosure, FIG. 15 is a rear view illustrating a main portion of a mask apparatus according to another embodiment of the present disclosure, and FIG. 16 is a view illustrating a state of wearing a mask apparatus according to another embodiment of the present disclosure.

A mask apparatus 3 according to another embodiment of the present disclosure is characterized in that a portion of the mask apparatus according to an embodiment of the present disclosure is modified. Some components included in the mask apparatus 3 according to another embodiment of the present disclosure may be the same as those included in the mask apparatus according to one embodiment of the present disclosure. Therefore, descriptions of some components included in the mask apparatus 3 according to other embodiments of the present disclosure may be understood by being replaced with descriptions of the same components included in the mask apparatus according to other embodiments of the present disclosure.

Referring to FIGS. 14 to 16, the mask apparatus 3 according to another embodiment of the present disclosure may include speakers 570 and 580 for outputting sound. The speakers 570 and 580 may include a first speaker 570 and a second speaker 580. A plurality of first speakers 570 are provided and may include a first speaker 571 on one side and a first speaker 572 on the other side. A plurality of second speakers 580 are provided and may include a second speaker 581 on one side and a second speaker 582 on the other side. The plurality of first speakers 570 and the plurality of second speakers 580 may be symmetrically disposed on both sides with respect to the center of the mask apparatus 3.

The first speaker 570 according to another embodiment of the present disclosure may be located under the mask body 10, and the second speaker 580 may be located on both sides of the mask body 10. The sound output from the first speaker 570 may be the sound input through the microphone 560. The sound output from the second speaker 580 may include sound information input through the microphone 560, previously stored sound information, sound information about music, or the like.

The first speaker 570 may be installed to be exposed toward the rear surface of the mask body 10. The sound output from the first speaker 570 may be resonated in the second boundary space B2*s* formed between the user and the mask apparatus 3 and output to the front of the mask apparatus 3.

Based on the rear surface of the mask apparatus 3, a first boundary space B1*s* may be formed on the outer circumferential surface of the sealing portion 40, and a second boundary space B2*s* may be formed on the outer circumferential surface of the mask body 10. A first boundary space B1*s* may be defined inside the first boundary space B1*s*, and a second boundary space B2*s* may be defined between the first boundary space B1*s* and the second boundary space B2*s*. A user's nose and mouth may be located in the first boundary space B1*s*, and a microphone 560 may be installed. When the mask apparatus 3 is worn on the user's face, the second boundary space B2*s* may be formed between the user's face and the mask apparatus 3. When the mask apparatus 3 is in close contact with the user's face, the second boundary space B2*s* may form an airtight space. When the second boundary space B2*s* forms an airtight space between the user's face and the mask apparatus 3, the second boundary space B2*s* may form a resonance space where sound can resonate. At this time, the second boundary space B2*s* may be defined as a third resonance space.

The mask apparatus 3 may include a front opening 600 and a rear opening 640. The front opening 600 may be formed in the mask body cover 20, and the rear opening 640 may be formed in the mask body 10. The front opening 600 and the rear opening 640 may communicate with each other. The front opening 600 may include a front opening 601 on one side and a front opening 602 on the other side. The rear opening 640 may include a rear opening 641 on one side and a front opening 642 on the other side.

A connection duct 610 may be included between the mask body 10 and the mask body cover 20 to communicate the front opening 600 and the rear opening 640. The connection duct 610 may extend from the mask body 10 toward the mask body cover 20 or may extend from the mask body cover 20 toward the mask body 10. When the mask body 10 and the mask body cover 20 are coupled, the front opening 600 and the rear opening 640 may communicate with each other by the connection duct 610. A connection space for connecting the front opening 600 and the rear opening 640 may be formed inside the connection duct 610.

The sound output from the first speaker 570 may resonate within the second boundary space B2*s*. Sound resonated within the second boundary space B2*s* may pass through the rear opening 640 and be output to the front opening 600. Sound transmitted from the rear opening 640 toward the front opening 600 may be amplified in the connection space and output to the front opening 600. In other words, the sound output from the first speaker 570 is firstly amplified in the second boundary space B2*s*, then passes through the rear opening 640, is secondarily amplified in the connection space, and then may be output to the external space through the front opening 600.

The second speaker 580 may be installed to be exposed toward the rear surface of the mask body 10. When the second speakers 580 are disposed on both sides of the mask body 10, sound output from the second speakers 580 can be quickly transmitted toward the user's ears.

According to the present disclosure, while minimizing power consumption of the first speaker 570, it is possible to output a loud sound to the front of the mask apparatus 3. In addition, since a resonance space is formed in the remnant space of the mask apparatus 3, sound output from the first speaker 570 can be amplified and the mask apparatus 3 can be designed optimally.

Although the present disclosure has been described in detail through representative embodiments, those skilled in the art will understand that various modifications are possible to the above-described embodiments without departing from the scope of the present disclosure. Therefore, the scope of the present disclosure should not be limited to and not be defined by the described embodiments, and should be defined by all changes or modifications derived from the claims and equivalent concepts as well as the claims to be described later.

The invention claimed is:

1. A mask apparatus comprising:

a mask body provided with a microphone;

a mask body cover coupled to a front surface of the mask body and having a front opening through which sound is output forward;

a sealing portion coupled to a rear surface of the mask body and forming a breathing space; and a first speaker fixed to one of the mask body or the mask body cover and outputting a sound input by the microphone;

wherein a first resonance space is formed between the mask body and the mask body cover to amplify the sound output from the first speaker and output the sound to the front opening, wherein the mask apparatus further comprises:

a second speaker fixed to one of the mask body or the mask body cover and outputting sound toward a user's ear;

a wireless communication portion for wireless communication;

a first boundary region forming a first boundary space in the sealing portion, the first boundary space being disposed inside the breathing space; and a second boundary region forming a second boundary space in the mask body, the second boundary space being disposed outside the breathing space, wherein the microphone is located in the first boundary space, wherein the first speaker and the second speaker are located in the second boundary space, wherein the first speaker outputs a sound input by the microphone, wherein the second speaker outputs a sound received by the wireless communication portion, and wherein the second speaker is located higher than the first speaker.

2. The mask apparatus of claim 1, further comprising:

a first space forming portion extending from one of the mask body or the mask body cover toward the other of the mask body and the mask body cover, wherein, when the mask body and the mask body cover are coupled, the first resonance space is formed inside the first space forming portion, and the first speaker is accommodated inside the first resonance space.

3. The mask apparatus of claim 1, wherein a second resonance space is formed between the mask body and the mask body cover to amplify the sound output from the second speaker and output the sound to a side opening provided in the mask body.

4. The mask apparatus of claim 3, further comprising:

a second space forming portion extending from one of the mask body or the mask body cover toward the other of the mask body and the mask body cover, wherein, when the mask body and the mask body cover are coupled, the second resonance space is formed inside the second space forming portion, and the second speaker is accommodated inside the second resonance space.

5. The mask apparatus of claim 1, further comprising:

a sensor portion for detecting user's breathing information;

a motor controller configured to manipulate the operation of a fan module supplying filtered air to the breathing space;

and a controller configured to control the operation of the first speaker and the second speaker.

6. The mask apparatus of claim 5, wherein, when the fan module is operated, the controller is configured to output an antiphase sound corresponding to the operating sound of the fan module to the second speaker.

7. The mask apparatus of claim 5, wherein the motor controller is configured to control the operation of the fan module based on the user's breathing information.

8. The mask apparatus of claim 7, wherein the first speaker outputs a sound input into the microphone after the rotation speed of the fan module is reduced by the motor controller.

9. The mask apparatus of claim 7, wherein the second speaker outputs a sound received through the wireless communication portion after the rotation speed of the fan module is reduced by the motor controller.

10. The mask apparatus of claim 1, wherein a rear opening is formed in the mask body, wherein the first speaker is provided on the rear surface of the mask body, and wherein a third resonance space is formed between the mask body and the user's face to amplify the sound output from the first speaker.

11. The mask apparatus of claim 10, wherein the sound output from the first speaker is firstly amplified in the third resonance space and then transmitted to the first resonance space through the rear opening, and is secondarily amplified in the first resonance space and then output to the outside through the front opening.

12. The mask apparatus of claim 1, wherein a plurality of first speaker are provided and are disposed spaced apart from both sides based on the center at the lower portion of the mask body or the mask body cover, and wherein a plurality of second speaker are provided and are disposed on both sides of the mask body or the mask body cover.

* * * * *